United States Patent
Hedayat

(10) Patent No.: US 10,420,121 B2
(45) Date of Patent: Sep. 17, 2019

(54) AGGREGATED HE CONTROL CONTENT IN A-MPDU

(71) Applicant: NEWRACOM, Inc., Irvine, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 28 days.

(21) Appl. No.: 15/343,072

(22) Filed: Nov. 3, 2016

(65) Prior Publication Data

US 2018/0020460 A1 Jan. 18, 2018

Related U.S. Application Data

(60) Provisional application No. 62/411,449, filed on Oct. 21, 2016, provisional application No. 62/344,199, (Continued)

(51) Int. Cl.
*H04J 3/22* (2006.01)
*H04W 72/12* (2009.01)
(Continued)

(52) U.S. Cl.
CPC .......... *H04W 72/12* (2013.01); *H04B 7/0413* (2013.01); *H04L 27/2602* (2013.01);
(Continued)

(58) Field of Classification Search
None
See application file for complete search history.

(56) References Cited

U.S. PATENT DOCUMENTS 9,699,086 B2 * 7/2017 Merlin .................... H04L 47/12
10,045,349 B2 * 8/2018 Atefi .................... H04W 72/046
(Continued)

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.
(Continued)

*Primary Examiner* — Kwang B Yao
*Assistant Examiner* — Juvena W Loo
(74) *Attorney, Agent, or Firm* — Nicholson De Vos Webster & Elliott LLP

(57) ABSTRACT

A method implemented by an Access Point (AP) in a Wireless Local Area Network (WLAN). The method includes providing, by the AP, a first Media Access Control (MAC) Protocol Data Unit (MPDU) in a downlink frame, where the first MPDU is addressed to a first set of stations and the first MPDU includes first trigger information for scheduling an uplink transmission, providing, by the AP, a second MPDU in the downlink frame, where the second MPDU is addressed to a second set of stations and the second MPDU includes second trigger information for scheduling the uplink transmission and the second trigger information includes a second set of values that are set to be the same as a first set of values in the first trigger information, and transmitting, by the AP, the downlink frame to the first and second set of stations.

20 Claims, 13 Drawing Sheets

Related U.S. Application Data filed on Jun. 1, 2016, provisional application No. 62/323,555, filed on Apr. 15, 2016, provisional application No. 62/298,859, filed on Feb. 23, 2016, provisional application No. 62/250,408, filed on Nov. 3, 2015.

(51) Int. Cl.
    *H04B 7/0413*     (2017.01)
    *H04L 27/26*     (2006.01)
    *H04W 84/12*     (2009.01)

(52) U.S. Cl.
    CPC ...... *H04L 27/2607* (2013.01); *H04L 27/2613* (2013.01); *H04W 72/121* (2013.01); *H04W 72/1289* (2013.01); *H04W 84/12* (2013.01)

(56) References Cited

U.S. PATENT DOCUMENTS

| | | | | |
|---|---|---|---|---|
| 2016/0165589 | A1* | 6/2016 | Chu | H04L 5/0007 370/329 |
| 2016/0366254 | A1* | 12/2016 | Asterjadhi | H04L 69/324 |
| 2017/0070914 | A1* | 3/2017 | Chun | H04L 1/0026 |
| 2017/0272138 | A1* | 9/2017 | Chun | H04B 7/0613 |
| 2017/0279864 | A1* | 9/2017 | Chun | H04L 65/4076 |
| 2017/0339692 | A1* | 11/2017 | Chun | H04W 72/0446 |
| 2018/0049240 | A1* | 2/2018 | Kim | H04W 74/08 |

OTHER PUBLICATIONS

IEEE Std 802.11ac-2013: "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.

* cited by examiner

Provide a first MPDU in a downlink frame, where the first MPDU is addressed to a first set of stations and the first MPDU includes first trigger information for scheduling an uplink transmission
560

Provide a second MPDU in the downlink frame, where the second MPDU is addressed to a second set of stations and the second MPDU includes second trigger information for scheduling the uplink transmission and the second trigger information includes a second set of values that are set to be the same as a first set of values in the first trigger information
565

Transmit the downlink frame to the first and second set of stations
570

FIG. 5B

| Frame Control | Duration | RA | TA | Common Info | Per User Info | ... | Per User Info | Padding | FCS |
|---|---|---|---|---|---|---|---|---|---|
| 2 | 2 | 6 | 6 | TBD | TBD | | TBD | TBD | 4 |

Octets

FIG. 6

| Trigger Type | Length | Cascade Information | CS Required | BW | CP and LTF Type | MU MIMO LTF Mode | # of LTF |
|---|---|---|---|---|---|---|---|
| | | 1 | 1 | 2 | 2 | 1 | 3 |

| STBC | LDPC Extra Symbol | AP Tx Power | Packet Extension | Spatial Reuse | Reserved | Type-dependent common Info |
|---|---|---|---|---|---|---|
| 1 | 1 | 6 | 3 | TBD | TBD | Variable |

Bits: 1

FIG. 7

| User Identifier | RU Allocation | Coding Type | MCS | DCM | SS Allocation | Target RSSI | Type dependent Per User Info |
|---|---|---|---|---|---|---|---|
| 12 | 8 | 1 | 4 | 1 | 6 | TBD | variable |

Bits:

FIG. 8

| PUT | User Identifier | RU Allocation | Coding Type | MCS | DCM | SS Allocation | Target RSSI | Type dependent Common Info | Type dependent Per User Info |
|---|---|---|---|---|---|---|---|---|---|
| TBD | 12 | 8 | 1 | 4 | 1 | 6 | TBD | variable | variable |

Bits

FIG. 9

| L-STF/LTF/SIG, SIG-A | HE SIG-B | HE STF/LTF | STA1 |
| --- | --- | --- | --- |
| | | | STA2 |
| | | | STA3 |
| | | | STA4 |

FIG. 15

AGGREGATED HE CONTROL CONTENT IN A-MPDU

CROSS-REFERENCE TO RELATED APPLICATIONS

This application claims the benefit of U.S. Provisional Application No. 62/250,408, filed Nov. 3, 2015, U.S. Provisional Application No. 62/298,859, filed Feb. 23, 2016, U.S. Provisional Application No. 62/323,555, filed Apr. 15, 2016, U.S. Provisional Application No. 62/344,199, filed Jun. 1, 2016, and U.S. Provisional Application No. 62/411,449, filed Oct. 21, 2016, which are hereby incorporated by reference.

FIELD OF INVENTION

The embodiments described herein related to the field of Wireless Local Area Network (WLAN) operation. More specifically, the embodiments described herein relate to the contents and structure of a High Efficiency Aggregated Control (HE A-Control) field. Other embodiments are also disclosed.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 GHz as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 MHz apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

WLAN devices are currently being deployed in diverse environments. These environments are characterized by the existence of many Access Points (APs) and non-AP stations (STAs) in geographically limited areas. Increased interference from neighboring devices gives rise to performance degradation. Additionally, WLAN devices are increasingly required to support a variety of applications such as video, cloud access, and offloading. Video traffic, in particular, is expected to be the dominant type of traffic in WLAN deployments. With the real-time requirements of some of these applications, WLAN users demand improved performance.

In a task group called Institute of Electrical and Electronics Engineers (IEEE) 802.11ax, High Efficiency WLAN (HEW) standardization is under discussion. The HEW aims at improving performance felt by users demanding high-capacity and high-rate services. The HEW may support uplink (UL) and downlink (DL) multi-user (MU) simultaneous transmissions, which includes Multi-User Multiple-Input Multiple-Output (MU-MIMO) and Orthogonal Frequency Division Multiple Access (OFDMA) transmissions.

In IEEE 802.11 systems, the MAC header of a MAC Protocol Data Unit (MPDU) may include a High Throughput (HT) Control field that is used to carry control information. The HT Control field may have a different field format depending on the variant. Some possible variants include the HT variant (for IEEE 802.11n) and the VHT variant (e.g., for IEEE 802.11ac). The HT Control field is typically four bytes in length. IEEE 802.11ax introduces a new field called High Efficiency Aggregated Control (HE A-Control) field that may replace the HT Control field. The HE A-Control field includes one or more High Efficiency (HE) Control subfields, where each HE Control subfield is used to carry a particular type of control information.

IEEE 802.11ax systems may allow the control information carried in the HE A-Control field to be different from one MPDU to another MPDU within the same Aggregated MPDU (A-MPDU). Also, some control information may be allowed to be repeated within the same A-MPDU. With these possibilities, there is a need to define the structure and rules of the control information that can be carried in the HE A-Control field to allow for unambiguous operation.

SUMMARY

A method is implemented by an Access Point (AP) in a Wireless Local Area Network (WLAN). The method includes providing, by the AP, a first Media Access Control (MAC) Protocol Data Unit (MPDU) in a downlink frame, where the first MPDU is addressed to a first set of stations and the first MPDU includes first trigger information for scheduling an uplink transmission, providing, by the AP, a second MPDU in the downlink frame, where the second MPDU is addressed to a second set of stations and the second MPDU includes second trigger information for scheduling the uplink transmission and the second trigger information includes a second set of values that are set to be the same as a first set of values in the first trigger information, and transmitting, by the AP, the downlink frame to the first and second set of stations.

A network device is configured to function as an Access Point (AP) in a Wireless Local Area Network (WLAN). The network device includes a Radio Frequency (RF) transceiver, a set of one or more processors, and a non-transitory machine-readable storage medium having stored therein an HE Control component. The HE Control component, when executed by the set of one or more processors, causes the network device to provide a first Media Access Control (MAC) Protocol Data Unit (MPDU) in a downlink frame, where the first MPDU is addressed to a first set of stations and the first MPDU includes first trigger information for scheduling an uplink transmission, provide a second MPDU in the downlink frame, where the second MPDU is addressed to a second set of stations and the second MPDU includes second trigger information for scheduling the uplink transmission and the second trigger information includes a second set of values that are set to be the same as a first set of values in the first trigger information, and transmit the downlink frame to the first and second set of stations.

A method is implemented by an Access Point (AP) in a Wireless Local Area Network (WLAN) to generate and transmit a Media Access Control (MAC) Protocol Data Unit (MPDU). The method includes generating a first MPDU, where a MAC header of the first MPDU includes a first High Efficiency Aggregated Control (HE A-Control) field, determining to include a group address as a receiver address in the first MPDU such that the first MPDU is addressed to stations referenced by the group address, where a High Efficiency Control Unicast Trigger Frame (HEC-UTR) subfield, which would carry uplink multi-user response scheduling information, is excluded from the first MPDU in response to a determination that the first MPDU includes the group address as the receiver address, and transmitting the first MPDU through a wireless medium.

A network device is configured to function as an Access Point (AP) in a Wireless Local Area Network (WLAN) to generate and transmit a Media Access Control (MAC) Protocol Data Unit (MPDU). The network device includes a Radio Frequency (RF) transceiver, a set of one or more processors, and a non-transitory machine-readable storage medium having stored therein an HE Control component. The HE Control component, when executed by the set of one or more processors, causes the network device to generate a first MPDU, where a MAC header of the first MPDU includes a first High Efficiency Aggregated Control (HE A-Control) field, determine to include a group address as a receiver address in the first MPDU such that the first MPDU is addressed to stations referenced by the group address, where a High Efficiency Control Unicast Trigger Frame (HEC-UTR) subfield, which would carry uplink multi-user response scheduling information, is excluded from the first MPDU in response to a determination that the first MPDU includes the group address as the receiver address, and transmit the first MPDU through a wireless medium.

A method is implemented by an Access Point (AP) in a Wireless Local Area Network (WLAN) to generate and transmit an Aggregated Media Access Control (MAC) Protocol Data Unit (A-MPDU) that elicits an uplink (UL) multi-user (MU) response. The method includes generating an A-MPDU according to a set of rules, where the set of rules includes a first rule that a trigger frame is not included in a MAC Protocol Data Unit (MPDU) of the A-MPDU when a High Efficiency Control Unicast Trigger Frame (HEC-UTR) subfield is included in a High Efficiency Aggregated Control (HE A-Control) field of an MPDU within the A-MPDU and transmitting the A-MPDU as a downlink transmission through a wireless medium.

A network device is configured to function as an Access Point (AP) in a Wireless Local Area Network (WLAN) to generate and transmit an Aggregated Media Access Control (MAC) Protocol Data Unit (A-MPDU) that elicits an uplink (UL) multi-user (MU) response. The network device includes a Radio Frequency (RF) transceiver, a set of one or more processors, and a non-transitory machine-readable storage medium having stored therein an HE Control component. The HE Control component, when executed by the set of one or more processors, causes the network device to generate an A-MPDU according to a set of rules, where the set of rules includes a first rule that a trigger frame is not included in a MAC Protocol Data Unit (MPDU) of the A-MPDU when a High Efficiency Control Unicast Trigger Frame (HEC-UTR) subfield is included in a High Efficiency Aggregated Control (HE A-Control) field of an MPDU within the A-MPDU and transmit the A-MPDU as a downlink transmission through a wireless medium.

BRIEF DESCRIPTION OF THE DRAWINGS

Embodiments are illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 5B is a flow diagram of a process for generating and transmitting MPDUs that elicit an uplink transmission, according to some embodiments.

FIG. 6 is a diagram illustrating a format of a trigger frame, according to some embodiments.

FIG. 7 is a diagram illustrating a format of a Common Info field, according to some embodiments.

FIG. 8 is a diagram illustrating a format of a Per-user Info field, according to some embodiments.

FIG. 9 is a diagram illustrating a format of a Per-user Info field in an MT trigger frame, according to some embodiments.

FIG. 15 is a diagram illustrating a downlink OFDMA transmission to a set of STAs, according to some embodiments.

DETAILED DESCRIPTION

Figure 1:
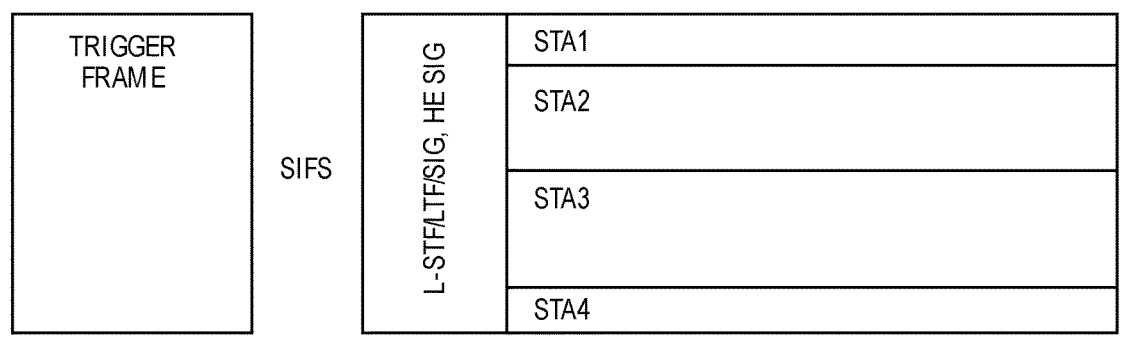
FIG. 1 is a diagram illustrating operations of a UL MU simultaneous transmission, according to some embodiments.

The embodiments disclosed herein provide methods and apparatus for generating and transmitting a Media Access Control (MAC) Protocol Data Unit (MPDU) and/or an Aggregated MPDU (A-MPDU). An embodiment is a method implemented by an Access Point (AP) in a Wireless Local Area Network (WLAN). The method includes providing, by the AP, a first MPDU in a downlink frame, where the first MPDU is addressed to a first set of stations and the first MPDU includes first trigger information for scheduling an uplink transmission, providing, by the AP, a second MPDU in the downlink frame, where the second MPDU is addressed to a second set of stations and the second MPDU includes second trigger information for scheduling the uplink transmission and the second trigger information includes a second set of values that are set to be the same as a first set of values in the first trigger information, and transmitting, by the AP, the downlink frame to the first and second set of stations. Other embodiments are also described and claimed.

In the following description, numerous specific details are set forth. However, it is understood that embodiments described herein may be practiced without these specific details. In other instances, well-known circuits, structures and techniques have not been shown in detail in order not to obscure the understanding of this description. It will be appreciated, however, by one skilled in the art that the embodiments described herein may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as non-transitory machine-readable media (e.g., machine-readable storage media such as magnetic disks, optical disks, read only memory, flash memory devices, phase change memory) and transitory machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more non-transitory machine-readable storage media (to store code for execution on the set of processors and data) and a set of one or more physical network interface(s) to establish network connections (to transmit code and/or data using propagating signals). Put another way, a typical electronic device includes memory comprising non-volatile memory (containing code regardless of whether the electronic device is on or off) and volatile memory (e.g., dynamic random access memory (DRAM), static random access memory (SRAM)), and while the electronic device is turned on that part of the code that is currently being executed is copied from the slower non-volatile memory into the volatile memory (often organized in a hierarchy) for execution by the processors of the electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Network devices or network elements can include APs and non-AP STAs in wireless communications systems such as a WLAN. STAs are devices connected to and communicating in a WLAN including client or user devices that connect to the WLAN via APs. APs are network devices that may be specialized wireless access points that can communicate with other network devices in the WLAN via the wireless medium or via wired connections. APs may be considered to be a type of STA. A non-AP STA or AP may be referred to herein as a WLAN device or STA.

As mentioned above, in a task group called Institute of Electrical and Electronics Engineers (IEEE) 802.11ax, HE WLAN (HEW) standardization is under discussion. The HEW may support uplink (UL) and downlink (DL) multi-user (MU) simultaneous transmissions. In an MU simultaneous transmission, multiple frames are transmitted to or from multiple STAs simultaneously using different resources, where the different resources could be different frequency resources in the case of an Orthogonal Frequency Division Multiple Access (OFDMA) transmission or different spatial streams in the case of a Multi-User Multiple-Input Multiple Output (MU-MIMO) transmission. Examples of MU simultaneous transmission include DL OFDMA, DL MU-MIMO, UL OFDMA, and UL MU-MIMO.

FIG. 1 is a diagram illustrating operations of a UL MU simultaneous transmission, according to some embodiments. For sake of clarity and ease of understanding, the operations are described in the context of a WLAN that includes an AP and at least four STAs (e.g., STA1, STA2, STA3, and STA4). It should be understood, however, that the embodiments described herein are not limited to this context. In the diagram, the horizontal dimension represents the time dimension (or number of Orthogonal Frequency-Division Multiplexing (OFDM) symbols), while the vertical dimension represents the frequency dimension (or number of tones or number of subcarriers). The AP may elicit a UL MU simultaneous transmission by transmitting a trigger frame in a unicast/multicast/broadcast manner such that all of the expected participants of the UL MU simultaneous transmission can receive and decode the trigger frame. In this example, the expected participants of the UL MU simultaneous transmission are STA1, STA2, STA3, and STA4. The trigger frame may serve multiple purposes. One purpose of the trigger frame is to provide a reference to the STAs that are expected to participate in the UL MU simultaneous transmission in terms of time and frequency with regard to the AP. Another purpose of the trigger frame is to provide information regarding the UL MU simultaneous transmission such as the set of STAs that are expected to participate in the UL MU simultaneous transmission, the allocation of transmission resources (or resource units (RUs)) to the STAs, and the Physical (PHY) layer and MAC layer attributes that the STAs are to use for the UL MU simultaneous transmission. After a predetermined time (e.g., Short Interframe Space (SIFS) time) from receiving the trigger frame, the STAs that participate in the upcoming UL MU simultaneous transmission simultaneously transmit a preamble followed by their respective payloads to the AP during the UL MU simultaneous transmission, which forms a UL MU PPDU (which is sometimes referred to as a trigger-based PPDU response or a UL MU response). The preamble may include symbols such as Legacy Short Training Field (L-STF), Legacy Long Training Field (L-LTF), Legacy Signal Field (L-SIG), and High Efficiency Signal Field (HE SIG). Each STA transmits its payload during the UL MU simultaneous transmission using a transmission resource assigned to itself (e.g., the assignment of transmission resources to STAs may be indicated in the trigger frame). The payload of each STA may be transmitted in a PSDU. In this example, STA1 transmits its payload using a first transmission resource, STA2 transmits its payload using a second transmission resource, STA3 transmits its payload using a third transmission resource, and STA4 transmits its payload using a fourth transmission resource.

The MAC header in IEEE 802.11 systems typically includes a High Throughput (HT) Control field that is used to carry control information. The HT Control field may have a different format depending on the variant. Some possible variants include the HT variant (for IEEE 802.11n) and the VHT variant (e.g., for IEEE 802.11ac). The HT Control field is typically four bytes in length. IEEE 802.11ax introduces a new field called High Efficiency Aggregated Control (HE A-Control) field that may replace the HT Control field. The HE A-Control field includes one or more High Efficiency (HE) Control subfields, where each HE Control subfield is used to carry a particular type of control information.

Figure 2:
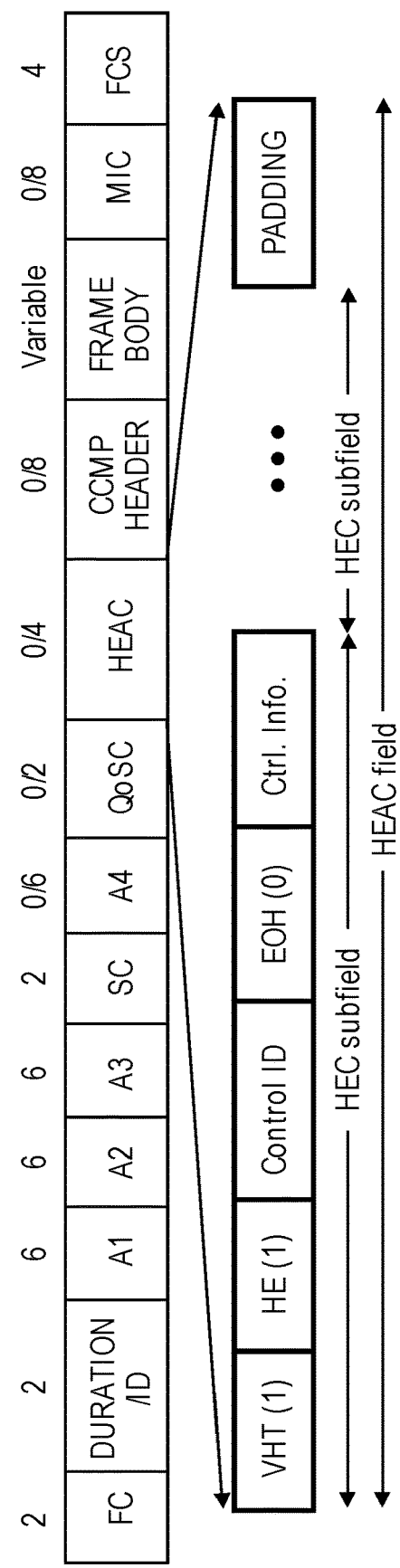
FIG. 2 is a diagram illustrating a format of a MAC frame that includes an HE A-Control field, according to some embodiments.

FIG. 2 is a diagram illustrating a format of a MAC frame that includes an HE A-Control field, according to some embodiments. The MAC frame includes, among other fields, an HE A-Control (HEAC) field. In one embodiment, the size of the HE A-Control field is a multiple of four bytes. In one embodiment, the size of the HE A-Control field is larger than four bytes and with no restriction of being a multiple of four bytes. In one embodiment, padding is added to the HE A-Control field such that the HE A-Control field has the expected size. The HE A-Control subfield may include one or more HE Control (HEC) subfields, where each HE Control subfield is used to carry a particular type of control information. In one embodiment, the first two bits of the HE A-Control field are both set to a value of '1' to indicate that the field is an HE A-Control field. Each HE Control subfield may include a Control Identifier (ID) subfield, an End of HE Control (EOH) subfield, and a Control Information subfield. The Control ID subfield in an HE Control subfield field may be used to carry information regarding the type of control information carried in that HE Control subfield. The EOH subfield may be used to indicate whether another HE Control subfield follows the current HE Control subfield. The Control Information subfield may be used to carry the actual control information.

There can be various types of HE Control subfields that are used to carry different types of control information. In one embodiment, the value in the Control ID subfield in an HE Control subfield indicates the type of that HE Control subfield (and thus the type of control information that is carried in that HE Control subfield). In one embodiment, each type of HE Control subfield has an a priori known length, and thus there is no need to explicitly indicate the length of the HE Control subfield. The boundaries between HE Control subfields can be bit-level boundaries or byte-level boundaries (e.g., if control information is encoded as a multiple of eight bits).

The types of control information that can be carried in an HE Control subfield include, but are not limited to, Acknowledgement (ACK), Block Acknowledgement (BA), Block Acknowledgement Request (BAR), Quality of Service Control (QoSC), Channel Quality Information Control (CQIC), Unicast Trigger (UTR), Receive Operating Mode Indication (ROMI), Resource allocation, and Power Control (PC).

HEC-BA and HEC-BAR

An HE Control subfield that carries information regarding BA is referred to herein as a High Efficiency Control (HEC) BA (HEC-BA) subfield. An HEC-BA subfield may carry information that is similar to the information carried in a standard BA control frame. An HE Control subfield that carries information regarding BAR is referred to herein as an HEC-BAR subfield. An HEC-BAR subfield may carry information that is similar to the information carried in a standard BAR control frame.

HEC-ROMI

An HE Control subfield that carries information regarding ROMI is referred to herein as an HEC-ROMI subfield. An HEC-ROMI subfield may carry information regarding a change in receiver operation (e.g., in terms of bandwidth and/or the number of spatial streams).

HEC-QoSC

An HE Control subfield that carries information regarding QoSC is referred to herein as an HEC-QoSC subfield. An HEC-QoSC subfield may carry information for requesting a STA to provide its buffer size or for providing buffer size information (e.g., a buffer status report). For example, a requesting STA (e.g., an AP) may use the HEC-QoSC subfield to request that another STA provide its buffer size (e.g., the size of the payload buffered at the STA to be sent to the AP in uplink direction) with a specified granularity. In one embodiment, the requesting STA requests that the responding STA provide its buffer size for one or more specified Traffic Identifiers (TIDs) or one or more specified Access Categories (ACs) with a specific granularity. In one embodiment, the requesting STA requests that the responding STA provide its buffer size for a subset of all TIDs or a subset of all ACs, e.g. all TIDs or all ACs. In one embodiment, the request for buffer status report includes a first granularity indicator for a first TID (or first AC), a second granularity indicator for a second TID (or second AC), and a third granularity indicator for the indicated subset of all TIDs (or the indicated subset of all ACs). In response to receiving such a request from a requesting STA (e.g., AP), the responding STA may use the HEC-QoSC subfield to report the buffer sizes for the requested TIDs (or ACs) with the indicated granularities (unless the buffer size is zero for some of the TIDs (or ACs), in which case the responding STA may not report the buffer size for these TIDs (or ACs)). In the case that there is no buffered data for any of the TIDs (or ACs), the responding STA may report zero buffer size for all TIDs (or all ACs) with an arbitrary granularity (or with the granularity indicated in the request). The responding STA may report buffer size with a given granularity by rounding-up the result of the buffer size divided by the granularity size. In another embodiment, the requesting STA does not indicate a preference for the granularity of the reported buffer size. In this case, the responding STA may decide the granularity to use and may indicate this granularity when reporting the buffer size. In one embodiment, the buffer status report includes a first granularity indicator for a first TID (or first AC), a second granularity indicator for a second TID (or second AC), and a third granularity indicator for all TIDs (or all ACs). In one embodiment, the requesting STA may request a particular granularity for the buffer size of a TID (or AC) or all TIDs (or ACs), but the responding STA may decide that the requested granularity would not appropriately represent the buffer size and may decide to use a different granularity. In this case, the responding STA may indicate this granularity in the buffer status report.

HEC-UTR

An HE Control subfield that carries information regarding a unicast trigger (UTR) is referred to herein as an HEC-UTR subfield (or UL MU Response Scheduling A-Control subfield). In one embodiment, an HEC-UTR subfield carries information that allows the recipient (e.g., a STA) of a frame that includes the HEC-UTR subfield to participate in an immediately following UL MU simultaneous transmission (e.g., transmission of a UL MU PPDU). Such information may be referred to as UL MU response scheduling information. The HEC-UTR subfield may be used to elicit a UL MU response (or a UL MU simultaneous transmission). In one embodiment, an HEC-UTR subfield includes a Resource Unit (RU) Index subfield that is used to carry information regarding the transmission resource (or resource unit) that the recipient STA should use and a Duration subfield that is used to carry information regarding the duration/length of the immediately following UL MU PPDU. In one embodiment, an HEC-UTR subfield further includes a Bandwidth (BW) subfield that is used to carry information regarding a bandwidth of the immediately following UL MU PPDU, an Modulation Coding Scheme (MCS)/Number of Spatial Streams (NSS)/Dual Sub-carrier Modulation (DCM) subfield that is used to carry information regarding the MCS/NSS/DCM to use, a Guard Interval (GI) subfield that is used to carry information regarding the GI to use, a Long Training Field (LTF) duration subfield that is used to carry information regarding the LTF to use, and/or a SIG-A subfield that is used to carry information regarding the SIG-A content of the immediately following UL MU PPDU (which carries some or all the bit sequence of the SIG-A field that all the participating STAs are to use).

In one embodiment, it is assumed that the bandwidth of the immediately following UL MU PPDU has the same bandwidth as the PPDU that includes the HEC-UTR subfield, and thus the bandwidth subfield may not be needed in the HEC-UTR subfield. In one embodiment, the value in the RU index subfield uniquely identifies the bandwidth, and thus the bandwidth subfield may not be needed in the HEC-UTR subfield. In one embodiment, it is assumed that the GI of the immediately following UL MU PPDU has a unique one-to-one relationship with the GI of the PPDU that includes the HEC-UTR subfield (e.g., a given value of GI of the PPDU that includes the HEC-UTR subfield uniquely identifies the GI of the immediately following UL MU PPDU).

In one embodiment, the size of the HE A-Control field may not be large enough to accommodate all of the necessary subfields of an HEC-UTR subfield. In this case, information may be carried by two or more HEC-UTR subfields, where each HEC-UTR subfield carries a subset of the full information such that the two or more HEC-UTR subfields together carry the full information. In such a case, each HEC-UTR subfield may carry identification information that identifies the order of the HEC-UTR subfield among the HEC-UTR subfields. For example, in an embodiment where two HEC-UTR subfields are used to carry the full information, each HEC-UTR subfield may include a single bit that is used to indicate the order of the HEC-UTR subfields. In an embodiment where three or four HEC-UTR subfields are used to carry the full information, each HEC-UTR subfield may include two bits that are used to indicate the order of the HEC-UTR subfields. In one embodiment, a STA that receives a frame with multiple HEC-UTR subfields acts upon the information carried in the HEC-UTR subfields if all of the HEC-UTR subfields are received correctly, and ignores the information carried in the HEC-UTR subfields if any of the HEC-UTR subfields are not received correctly. In one embodiment, the identification information (regarding the ordering of the HEC-UTR subfields) may be part of the Control ID in the Control ID subfield (e.g., there can be multiple Control IDs for an HEC-UTR subfield, where each HEC-UTR subfield includes a subset of all the necessary subfields). In one embodiment, an HEC-UTR subfield may be included in an MPDU of an A-MPDU and a unicast rigger frame may be included in another MPDU within the same A-MPDU. In such a case, in one embodiment, the HEC-UTR subfield and the trigger frame carry the same scheduling information (e.g., same PHY properties, same RU allocation, and same duration/length).

HEC-CQIC

An HE Control subfield that is used to carry information regarding CQIC is referred to herein as an HEC-CQIC subfield. An HEC-CQIC subfield may carry information regarding channel quality (e.g., MCS/NSS recommendation or signal-to-noise ratio (SNR) measurement). The channel quality information may include information regarding CQIC token, MCS feedback, NSS feedback, SNR report, BW, and RU index. In one embodiment, a reserved value for RU index indicates that the feedback reports are for full band. Other values for RU index indicate the specific RU that the feedback (e.g., MCS/NSS/SINR) is reported for. In one embodiment, an HEC-CQIC subfield may include a CQI request subfield that is used to indicate that a CQI measurement report is requested, a CQI report subfield that is used to indicate that a CQI measurement report is being provided, a CQI request type subfield that is used to indicate the CQI request type, a CQI report subfield that is used to carry a CQI measurement report, an RU index subfield that is used to carry information regarding the RU that the CQI measurement report is being requested/provided for, a CQI token subfield that is used to indicate a CQI token, a measurement request subfield that is used to carry information regarding the type of frame and/or specific field of a frame that measurement is requested for, a measurement report subfield that is used to carry information regarding the type of frame and/or specific field of a frame that measurement is reported based upon, a measurement report bandwidth subfield that is used to carry information regarding the bandwidth of a frame that measurement is reported based upon (or report is prepared from multiple frames with the same or different bandwidth), a measurement request bandwidth subfield that is used to carry information regarding the bandwidth of a frame that measurement report is requested for (or that the report may be prepared from multiple frames with the same or different bandwidth), a measurement report beamforming subfield that is used to indicate whether the frame that measurement report is prepared from is beamformed or not, a measurement request beamforming subfield that is used to indicate whether the frame that the measurement report is requested is to be prepared from is to be beamformed or not.

HEC-PC

An HE Control subfield that is used to carry information regarding PC is referred to herein as an HEC-PC subfield. With the introduction of UL MU simultaneous transmissions in IEEE 802.11ax, there is a need to control the transmission power of STAs so that the classic near-far problem does not severely affect the AP when it receives transmission from two STAs simultaneously, where one STA has much larger path-loss than the other STA. In such a near-far case, the signal received from one STA could be much stronger than the signal received from the other STA, and this could cause some problems in the Radio-Frequency (RF) circuitry and in baseband processing. For example, the Aggregate Gain Control (AGC) could be heavily influenced by the stronger signal and the weaker signal may get drowned in the noise floor or the frequency-image of the stronger signal could be on the same resource-unit as the weaker signal. Considering the above possibilities, one solution is to allow an AP to request STAs to adjust their transmission power. This capability is referred to herein as PC.

An HEC-PC subfield may carry information for requesting a STA to adjust its transmission power (e.g., a power adjustment request). A power adjustment can be indicated as an absolute power (e.g., within a fixed range such as 13-20 dBm or within an adjustable range to accommodate various regulatory domains). Depending on the range of the absolute power, the number of bits required to indicate the transmission power may vary. For example, for a range of 13-20 dBm, three bits is sufficient to indicate the transmission power with granularity of 1 dB (e.g., 13, 14, . . . , 20 dBm). Four bits is sufficient to indicate the transmission power with granularity of 0.5 dBm (e.g., 13, 13.5, 14, 14.5, . . . , 20 dBm). In one embodiment, a power adjustment can be indicated as a relative power adjustment that indicates by how much the STA should increment or decrement its transmission power.

In one embodiment, power adjustment is not performed using a request/response mechanism. Without using a request/response mechanism, there may be longer delay and the possibility of overshoot. In one embodiment, an HEC-PC subfield includes a REQ subfield that is set to a value of TRUE (or other predetermined value that indicates power adjustment is requested) when it is included in a frame sent from an AP to a STA. In one embodiment, an HEC-PC subfield includes a RESP subfield that is set to a value of TRUE (or other predetermined value that indicates power adjustment has been performed) when it is included in a frame sent from a STA to an AP (after the STA performs power adjustment). In one embodiment, the REQ subfield and RESP subfield occupy the same bit location and the distinction between the REQ subfield and RESP subfield is implied based on whether the frame is sent by an AP or by a STA.

HEC-RUA

Figure 3:
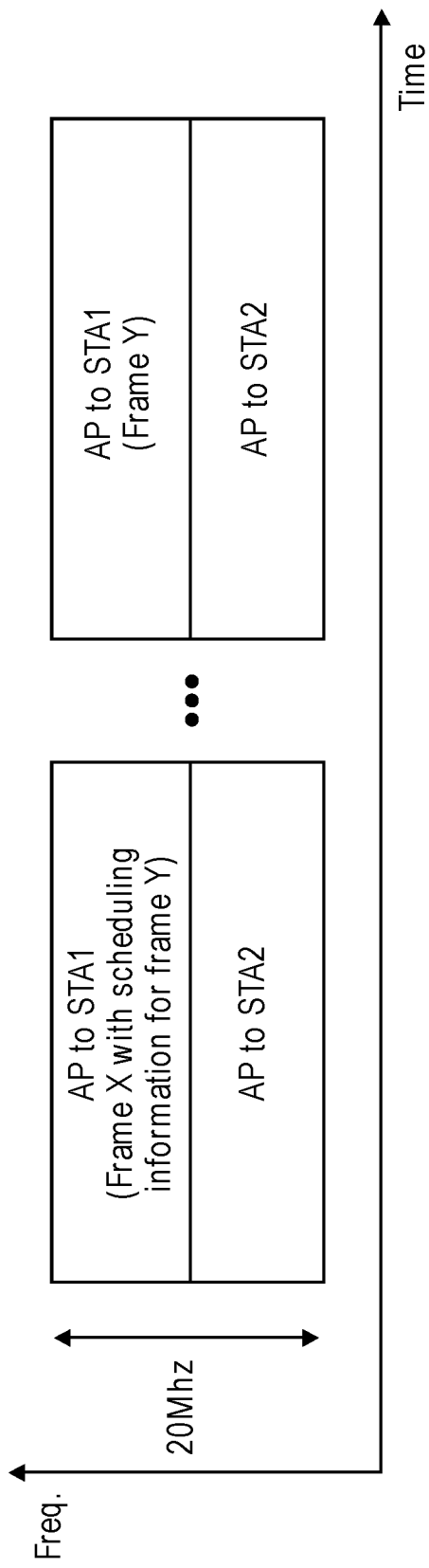
FIG. 3 is a diagram illustrating operations of a MU assignment procedure for a set of upcoming frames, according to some embodiments.

An HE Control subfield that carries information regarding MU RU assignments is referred to herein as an HEC-RUA subfield. When an AP sends a frame to one or more STAs, the AP may include scheduling information for one or more upcoming downlink frames (e.g., one or more immediately upcoming frame) in the current frame (which may be an SU frame or an MU frame). For example, as shown in FIG. 3, downlink frame X (from AP to STA1) may include scheduling information for upcoming downlink frame Y (also from AP to STA1). The scheduling information may include the required PHY/MAC attributes of the one or more upcoming downlink frames and the resource unit assignment for the one or more STAs. For example, the AP may include an indication in a current downlink frame (which may be an SU frame or MU frame) to one or more recipient STAs regarding the payload in one or more upcoming downlink frame with the following properties: a) an estimated transmission time of the upcoming downlink frame (e.g., SIFS after the current frame, or in units of micro-second, milli-second or in units of Beacon intervals); b) the transmission resource (e.g., RU) allocated for each of the one or more recipient STAs (e.g., could be the same RU that carries the data or control information in the current frame); c) PHY attributes of the one or more upcoming downlink frames such as the following set for each PPDU: length of the upcoming PPDU, guard interval (GI)/cyclic prefix (CP) size, LTF type and size, Space-Time Block Coding (STBC), beamforming, packet extension, beam change, doppler, coding, MCS, NSS, and DCM. Such information regarding the upcoming frame/PPDU may help the recipient STA to possibly enter a low-power mode (e.g., sleep mode) until the approximate arrival time of the first frame that is expected to have a payload for the STA and/or to operate on a narrowest bandwidth that is necessary to process and decode its payload in the specific RU of the upcoming PPDU, which helps the STA reduce power consumption. The narrowest bandwidth required to process and decode the payload may be one or more 20 MHz subchannels in which the RU resides or may be the same bandwidth as the indicated RU. For example, the AP may announce, in a data frame or control frame, that the intended recipient of the current frame has a downlink payload in the immediately upcoming downlink frame with a particular set of attributes. In one embodiment, by indicating the RU index of the upcoming payload, the intended recipient may know which 20 MHz subchannel the payload is in and would know whether it is the primary 20 MHz subchannel or other 20 MHz subchannel. In one embodiment, an AP announces the full set of attributes of the upcoming frame in the current frame, whereas in another embodiment, the AP only announces the attributes that are different from the current frame. For example, if the set of attributes (e.g., GI/CP size, LTF type and size, STBC, beamforming, packet extension, beam change, doppler, coding, MCS, NSS, DCM) of the upcoming frame is the same as the current frame, then the AP may indicate that these attributes are the same as the current frame and avoids repeating them, and only announces the length of the upcoming PPDU and the RU index. In one embodiment, if the RU index of the expected payload in the upcoming frame is the same, the AP indicates this and avoids repeating the RU index. In one embodiment, the information regarding MU RU assignments is carried in a control subfield in an HE Control subfield or HE A-Control field of the MAC header of a frame, hence denoted as HEC-RUA. In another embodiment, the information regarding MU RU assignments is carried in a control frame (e.g., as part of an A-MPDU).

HEC-IQIM

An HE Control subfield that carries information regarding IQ-Imbalance Parameters is referred to herein as an HEC-IQIM subfield. With the introduction of UL OFDMA transmissions in IEEE 802.11ax systems, there is a chance that mirror RUs cause interference with each other due to IQ-imbalance of the STAs that are scheduled to transmit in mirror RUs. There is typically not much that can be done to alleviate IQ imbalance at the transmitting side. In one embodiment, IQ imbalance may be dealt with on the receiver side, assuming that an AP has some knowledge regarding the IQ imbalance parameters of the transmitting STAs. In one embodiment, the AP takes into account the IQ-imbalance of the STAs during scheduling. For example, the AP may avoid scheduling STAs with large IQ imbalance in UL OFDMA transmissions or the AP may avoid scheduling a STA with large IQ imbalance in UL OFDMA transmissions in an RU that is mirror to an RU that is assigned to a STA whose received Received Signal Strength Indicator (RSSI) in the recent past is low. In one embodiment, an AP uses its knowledge of the IQ imbalance parameters of the transmitting STAs to post-process the received baseband signals of the mirror RUs that experience interference due to the large IQ imbalance.

In one embodiment, the STA may provide its IQ imbalance parameters in an HEC-IQIM subfield. In such an embodiment, the HEC-IQIM subfield may carry quantized values or range of values of amplitude imbalance and/or quantized values or range of values of phase imbalance. The HEC-IQIM subfield may utilize a request/response format. For example, an AP may request that the STA provide IQ-imbalance parameters by setting a request subfield in an HEC-IQIM subfield to a particular value to indicate that a request is being made and the STA may provide the quantized values or range of values of amplitude/phase imbalance in an HEC-IQIM subfield and set a response subfield in the HEC-IQIM subfield to a particular value to indicate that a response is being provided. In one embodiment, a STA always sends an HEC-IQIM subfield prior to sending a UL MU frame (e.g., as part of request for UL transmission opportunity that is sent to its associated AP) or with the frames sent to the AP during the UL MU TXOP. In another embodiment, the IQ-imbalance parameters might be sent to the AP as part of a management frame, within which the STA provides quantized values or range of values of tis amplitude imbalance and quantized values or range of values of its phase imbalance to the AP. In one embodiment, the IQ-imbalance parameters might be sent to the AP as part of an Information Element (IE) within an Association Request, within which the STA provides quantized values or range of values of its amplitude and phase imbalance to the AP.

IEEE 802.11ax systems may allow the control information carried in the HE A-Control field to be different from one MPDU to another MPDU within the same Aggregated MPDU (A-MPDU). Also, some control information may be allowed to be repeated within the same A-MPDU. With these possibilities, there is a need to define the structure and rules of the control information that can be carried in the HE A-Control field.

Figure 4:
FIG. 4 is a diagram illustrating various types of HE Control subfields aggregated within an A-MPDU, according to some embodiments.

FIG. 4 is a diagram illustrating various types of HE Control subfields aggregated within an A-MPDU, according to some embodiments. As shown in FIG. 4, the A-MPDU includes multiple MPDUs. Each MPDU may include one or more HE Control subfields in its MAC header. For example, the first MPDU in the A-MPDU includes two HE Control subfields, where one of them is of a first type (HEC1) and the other is of a second type (HEC2). The second MPDU in the A-MPDU includes an HE Control subfield that is of a third type (HEC3). The third MPDU in the A-MPDU includes two HE Control subfields, where one of them is of the third type (HEC3) and the other is of the second type (HEC2). The last MPDU in the A-MPDU includes two HE Control subfields, where one of them is of the third type (HEC3) and the other is of a fourth type (HEC4). As shown in the diagram, the type(s) of HE Control field(s) included in one MPDU can be different from one MPDU to another MPDU within the same A-MPDU. Also, it is possible for a particular type of HE Control field to be repeated in more than one MPDU (e.g., as shown in FIG. 4, HEC2 is included in the first MPDU and the third MPDU).

Rules for HE Control Subfield Repetition in an A-MPDU

In one embodiment, if a specific type of HE Control subfield is repeated within an A-MPDU, then the control information carried in that specific type of HE Control subfield is the same across multiple appearances of that specific type of HE Control subfield within an A-MPDU. This is to ensure that the recipient of the A-MPDU receives unambiguous control information from the sender. In one embodiment, the control information carried in the following types of HE Control subfields is the same across multiple appearances of the same type of HE Control subfield within an A-MPDU: HEC-ACK subfield, HEC-ROMI subfield, and HEC-PC subfield. In an embodiment where non-contiguous OFDMA transmission resource allocation is not allowed, the control information carried in a HEC-UTR subfield is the same across multiple appearances of an HEC-UTR subfield within an A-MPDU.

In one embodiment, repetition of particular types of HE Control subfields is allowed under certain conditions. Repetition of an HE Control subfield may be in the form of two or more HEC subfields of a particular type appearing in the same A-MPDU (but each in a separate MPDU). In one embodiment, repetition of a particular type of HE Control subfield is allowed if the control information carried in all of the HE Control subfields of that particular type is the same. In one embodiment, two or more HE control subfields of a particular type may appear in the same A-MPDU (but each in separate MPDUs), where each HE Control subfield of that particular type carries different control information.

In one embodiment, the repetition of a particular type of HE Control subfield is allowed if each occurrence of that particular type of HE Control subfield carries control information that provides a report of some form. In one embodiment, if an A-MPDU includes more than one occurrence of a particular type of HE Control subfield that carries control information that provides a report, the control information carried in such HE Control subfields is the same.

In one embodiment, the repetition of a particular type of HE Control subfield is allowed if each occurrence of that particular type of HE Control subfield carries control information that requests a report of some form. In one embodiment, if an A-MPDU includes more than one occurrence of a particular type of HE Control subfield that carries control information that requests a report, the control information carried in such HE Control subfields is the same.

Some types of HE Control subfields include a subfield that carries control information that does not utilize a request/report mechanism. These types of subfields may be referred to as announcement subfields. For example, the RU index subfield in HEC-UTR subfield is an announcement subfield. In one embodiment, the repetition of a particular type of HE Control subfield is allowed if each occurrence of that particular type of HE Control subfield carries control information that provides an announcement of some form (e.g., carried in an announcement subfield). In one embodiment, if an A-MPDU includes more than one occurrence of a particular type of HE Control subfield that carries control information that provides an announcement, the control information carried in such HE Control subfields is the same. In one embodiment, the announcement may include resource units assigned for OFDMA scheduling, receive operation, attributes of the frames with same access categories or same traffic identifier, attribute of pending payloads with the same access categories or same traffic identifier, and reception attributes of past frames. In one embodiment, multiple HE Control subfields of the same type may appear in a MAC header or in a control frame. The rules described above may also be applicable in such a case.

Rules for HEC-CQIC Subfield Repetition in A-MPDU

An HEC-CQIC subfield may carry control information that requests or reports channel quality information for each subchannel or resource unit. In one embodiment, if a STA wishes to provide MCS and NSS recommendation or SINR reports per individual RUs, then the STA may include several HEC-CQIC subfields in an A-MPDU, where each HEC-CQIC subfield carries channel quality information for a particular RU. In order to make the most out of each HE Control subfield in a large A-MPDU, in one embodiment, the STA includes an HEC-CQIC subfield that carries channel quality information for one RU in one MPDU and then includes an HEC-CQIC subfield that carries channel quality information for another RU in another MPDU and so on (it should be noted that an HEC-CQIC subfield may carry channel quality information for full-band instead of a particular RU). In one embodiment, multiple HEC-CQIC subfields may appear in a MAC header or in a control frame. The rules described above may also be applicable in such a case.

In one embodiment, if an HEC-CQI subfield in an MPDU in an A-MPDU carries channel quality information for full-band, then another HEC-CQI subfield in another MPDU (in the same A-MPDU) that also carries channel quality information for full-band carries the same channel quality information. In one embodiment, if an HEC-CQI subfield in an MPDU in an A-MPDU carries channel quality information for a particular RU, then another HEC-CQI subfield in another MPDU (in the same A-MPDU) that carries channel quality information for that particular RU carries the same channel quality information. In one embodiment, a STA may provide channel quality information for one or more RUs and for full-band in one A-MPDU across several HEC-CQIC subfields, where each HEC-CQIC subfield carries channel quality information for a particular RU or full-band.

In one embodiment, solicited and unsolicited channel quality information is provided in one A-MPDU across several different HEC-CQIC subfields. For example, a STA may send a frame to a second STA, where the frame includes an A-MPDU that includes one or more HEC-CQIC subfields that carry channel quality information that is provided in response to a request from the second STA, along with one or more HEC-CQIC subfields that carry channel quality information for other RUs (that were not requested) and/or full-band.

Rules for HEC-UTR Subfield Repetition

In one embodiment, if non-contiguous assignment of RUs is not allowed, then the control information carried in all HEC-UTR subfields across an A-MPDU is the same. In one embodiment, if multiple trigger frames are included in one or more A-MPDUs in a PPDU (e.g., there could be multiple A-MPDUs in a DL MU PPDU), the control information carried in the trigger frames is such that it causes the participating STAs (e.g., identified in the trigger frames) to respond with a UL MU simultaneous transmission such that the transmissions by the respective STAs are combined properly/constructively. In one embodiment, this rule is also observed when there is a combination of HEC-UTR subfields and/or trigger frames in one or more A-MPDUs in a PPDU. In one embodiment, an A-MPDU includes either one or more HEC-UTR subfields or one or more trigger frames addressed to the same STA, but not both.

In one embodiment, multiple trigger frames and/or MPDUs that include an HEC-UTR subfield are included in multiple A-MPDUs. For example, a first trigger frame may be included in a first A-MPDU that is transmitted in a first RU of a downlink transmission for a first STA or set of STAs, a second trigger frame may be included in a second A-MPDU transmitted in a second RU of the downlink transmission for a second STA or set of STAs, and an MPDU that includes one or more HEC-UTR subfields may be included in a third A-MPDU that is transmitted in a third RU of the downlink transmission for a third STA or set of STA. In such a case, the trigger frames and/or the HEC-UTR subfields carry information such that it causes the STAs expected to participate in the immediately following UL MU simultaneous transmission to transmit using the same duration/length, CP and LTF type, HE SIG-A info (including Spatial Reuse field), and UL MU PPDU bandwidth. In one embodiment, the Cascade Indication, Trigger Type, and Trigger-dependent Common Info subfields in the multiple trigger frames in the multiple A-MPDUs carry different control information. For example, a first trigger frame in a first A-MPDU transmitted in a first RU of a downlink transmission may indicate trigger type TT1 (e.g., for MU-BAR) and cascade indication CI1 (e.g., CI1=0) and a second trigger frame in a second A-MPDU transmitted in a second RU of the downlink transmission may indicate trigger type TT2 (e.g., for random access) and cascade indication CI2 (e.g., CI2=1).

In one embodiment, if a STA receives an A-MPDU that includes one or more HEC-UTR subfields (e.g., in one or more of the frames in the A-MPDU) and/or one or more trigger frames (e.g., receives one or more trigger frames with matching Association Identifier (AID) within one or more Per-user Info subfields), but the control information carried in these HEC-UTR subfields and/or trigger frames is not the same, then the STA ignores the control information carried in these HEC-UTR subfields and trigger frames in the received A-MPDU. In one embodiment, if a STA receives an A-MPDU that includes both an HEC-UTR subfield (e.g., in one of the frames in the A-MPDU) and a trigger frame, the STA ignores the information carried in the HEC-UTR subfield and the trigger frame (and does not respond). In one embodiment, an HEC-UTR subfield is not allowed to be included in an A-MPDU that has a groupcast address (e.g., multicast-group address or broadcast address) as the intended recipient. In one embodiment, a STA that receives such an A-MPDU ignores the information carried in the HEC-UTR subfield (and does not respond).

In an embodiment where non-contiguous assignment of RUs is allowed, it may be possible for an A-MPDU to include multiple HEC-UTR subfields for non-contiguous RU assignment in the immediately following uplink transmission (e.g., each HEC-UTR subfield carries information for an RU assignment and associated attributes). In such cases, an AP may assign multiple non-contiguous RUs to a STA to schedule a non-contiguous uplink transmission. In such embodiments, the STA that is the recipient of multiple HEC-UTR subfields sends an MPDU or A-MPDU for each of the resource assignments or RU that appears in each of the HEC-UTR subfields.

Some of the above embodiments may be described in IEEE 802.11 terminology as follows. Note that in this terminology "UL MU Response Scheduling A-Control subfield" is an alternative name for HEC-UTR. In one embodiment, if dot11MultiBSSIDActivated is false, then the Transmitter Address (TA) field of a Trigger frame is set to a predetermined ID. In one embodiment, if dot11MultiBSSIDActivated is true and at least two of the Trigger frame recipient STAs are associated with two different Basic Service Set Identifiers (BSSIDs), then the TA field is set to an ID that represents the set of Basic Service Set (BSS) that are operated within the multi-BSS AP. Such ID could be the BSSID of one of the set of BSS that is a priori known to all the STAs belonging to all the BSS of the multi-BSS AP, or it could be a different ID (a different BSSID) that is not the same to the BSSID of any of the BSS belonging to the multi-BSS AP, but a priori known to all the STAs associated to each of the BSS. In one embodiment, the Receiver Address (RA) field of the MPDUs sent in response to a Trigger frame is set to a predetermined value. In one embodiment, an AP does not set any subfields of the Common Info field of a Trigger frame to a value that is not supported by all the recipient STAs of the Trigger frame. In on embodiment, an AP does not set any subfields of the User Info field of a Trigger frame to a value that is not supported by the recipient STAs of the User Info field. In one embodiment, an AP does not set any subfields of an UL MU Response Scheduling A-Control subfield in an HE variant HT Control field to a value that is not supported by the recipient STAs of the User Info field. In one embodiment, an AP sets all the subfields of the Common Info field, except the Trigger Type subfield and Trigger-dependent Common Info of a Trigger frame to the same value of the corresponding subfield of the Common Info field of any other Trigger frame that is carried in the same PPDU. In another embodiment, an AP sets all the subfields of the Common Info field of a Trigger frame to the same value of the corresponding subfield of the Common Info field of any other Trigger frame that is carried in the same PPDU, except the following subfields: Trigger Type, AP TX Power, Cascade Indication, CS Required, Trigger-dependent Common Info, and/or BW.

In one embodiment, an AP sets UL PPDU Length and DL TX Power subfields of an UL MU Response Scheduling A-Control subfield to the same value of the corresponding subfield of any UL MU Response Scheduling A-Control that is carried in the same PPDU. In one embodiment, an AP sets the following subfields of the Common Info field of a Trigger frame accordingly if an UL MU Response Scheduling A-Control subfield is carried in an MPDU within the same PPDU: (1) MU-MIMO LTF Mode and STBC are set to 0, (2) Number of HE-LTF Symbols is set to 1, (3) Spatial Reuse is set to SR_Disallowed, (4) GI and LTF Type is set to 3 if the carrying PPDU TXVECTOR parameter CP_LTF_TYPE is 4×LTF+3.2 µs CP or 2× LTF+1.6 µs CP; otherwise is set to 2. In one embodiment, if a Trigger frame is transmitted in an RU of an HE MU PPDU and the RU is addressed to multiple STAs, then the Trigger frame does not include any User Info fields addressed to a STA that is identified as recipient of another RU or spatial stream of the same HE MU PPDU.

Rules for HEC-BA Subfield and HEC-BAR Subfield Repetition

In one embodiment, multiple HEC-BA subfields may appear in an A-MPDU. In such a case, in one embodiment, each HEC-BA subfield carries information for providing block acknowledgement for a specified TID. In one embodiment, if multiple HEC-BA subfields carrying information for providing block acknowledgement for the same TID appear in an A-MPDU, the control information carried in these HEC-BA subfields is the same.

In one embodiment, multiple HEC-BAR subfields may appear in an A-MPDU. In such a case, in one embodiment, each HEC-BAR subfield carries information for requesting a block acknowledgement for a specified TID. In one embodiment, if multiple HEC-BAR subfields carrying information for requesting block acknowledgement for the same TID appear in an A-MPDU, the information carried in these HEC-BAR subfields is the same.

In one embodiment, if an HEC-BAR subfield appears in an A-MPDU, then an HEC-UTR subfield is also included in at least one MPDU in the A-MPDU or a trigger frame is included in the A-MPDU. In one embodiment, a STA does not send a BA frame in response to receiving an HEC-BAR subfield if the STA does not also receive an HEC-UTR subfield in the same frame that includes the HEC-BAR subfield or if the STA does not receive a unicast trigger frame in the same A-MPDU that includes the frame that includes the HEC-BAR subfield. In one embodiment, an HEC-BAR subfield may appear in an A-MPDU without an HEC-UTR subfield in the same A-MPDU and without a unicast trigger frame in the same A-MPDU as long as there is an indication that the immediately following frame is not an MU frame. In such a case, the recipient STA may respond with a BA frame after an IFS interval (e.g., SIFS). The indicator that indicates whether the immediately following frame is an MU frame or not may be referred to as an MU frame indicator (MUFI). The MUFI may be carried in the HEC-BAR subfield, carried in another existing field (e.g., as a bit in an existing field in the MAC header), or carried in an HEC-UTR subfield. In one embodiment, when the frame that includes the HEC-BAR subfield is a unicast SU frame, the immediately following frame is also an SU frame (e.g., it is assumed that the following frame is an SU frame even without explicit indication by MUFI). In such a case, an HEC-UTR subfield may not need to accompany the HEC-BAR subfield.

In one embodiment, when a first STA communicates with a second STA suing a TXOP that the first STA owns and controls, if an HEC-BAR subfield is included in a frame sent from the first STA to the second STA, then an HEC-UTR subfield or unicast trigger frame may not be included in the same A-MPDU if the first STA (the TXOP owner) has given permission to the second STA to use the TXOP (in the reverse direction TXOP operation). In this case, the second STA may include a BA frame in the A-MPDU that it sends to the first STA or include one or more HEC-BA subfields in one or more MPDUs of the A-MPDU it sends to the first STA. In an embodiment where multiple of the above-mentioned HEC subfields appear together in a frame (instead of appearing in multiple MPDUs of an A-MPDU), the above-mentioned rules similarly apply.

In one embodiment, either an HEC-BA subfield or an HEC-ACK subfield may be included in an A-MPDU, but not both. In one embodiment, if both an HEC-BA subfield and an HEC-ACK subfield are included in the same A-MPDU, the receiving STA ignores the control information carried in the HEC-ACK subfield and processes the control information carried in the HEC-BA subfield. In an embodiment where multiple of the above-mentioned HE Control subfields appear together in a control frame (instead of appearing in multiple MPDUs of an A-MPDU), the above-mentioned rules similarly apply.

In one embodiment, if an HEC-ROMI subfield is included in an MPDU in an A-MPDU, an HEC-BAR subfield is not allowed to be included in another MPDU in the same A-MPDU. This is due to the outage time that the sender of the HEC-ROMI subfield goes through until becoming ready to receive or send another frame. In one embodiment, if an HEC-ROMI subfield is included in an MPDU in an A-MPDU, an HEC-UTR subfield is not allowed to be included in another MPDU in the same A-MPDU. In an embodiment where multiple of the above-mentioned HEC subfields appear together in a control frame, the above-mentioned rules similarly apply.

An AP or non-AP STA may generate one or more frames that carry control information according to one or more of the repetition rules described above. Adhering to a set of repetition rules such as those described above allows the recipient to properly interpret control information carried in the frames without ambiguity. Various embodiments are described with reference to FIGS. 5A-D.

Figure 5A:
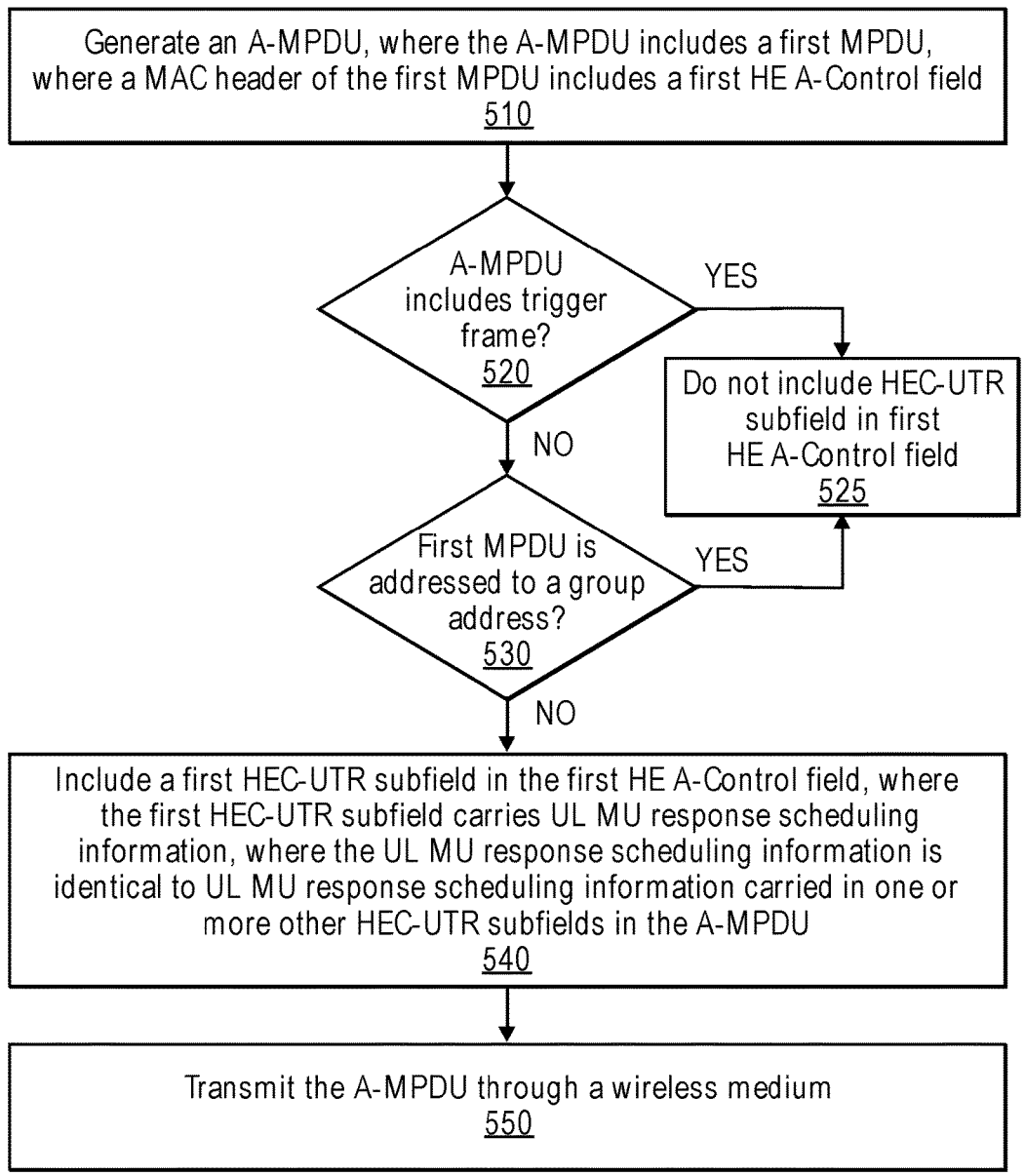
FIG. 5A is a flow diagram of a process for generating and transmitting an A-MPDU that elicits a UL MU response, according to some embodiments.

FIG. 5A is a flow diagram of a process for generating and transmitting an A-MPDU that elicits a UL MU response, according to some embodiments. In one embodiment, the process is implemented by an AP in a WLAN. However, it should be understood that the process may also be implemented by a non-AP STA. The operations in this flow diagram will be described with reference to the exemplary embodiments of the other figures. However, it should be understood that the operations of the flow diagram can be performed by embodiments other than those discussed with reference to the other figures, and the embodiments discussed with reference to these other figures can perform operations different than those discussed with reference to the flow diagram.

In one embodiment, the process is initiated when the AP generates an A-MPDU (block 510). The A-MPDU includes a first MPDU, where a MAC header of the first MPDU includes a first HE A-Control field.

The AP determines whether the A-MPDU includes a trigger frame (decision block 520). If the AP determines that the A-MPDU includes a trigger frame, then the AP does not include an HEC-UTR subfield in the first HE A-Control field (block 525). However, if the AP determines that the A-MPDU does not include a trigger frame, then the AP determines whether the first MPDU is addressed to a group address (decision block 530). If the AP determines that the first MPDU is addressed to a group address, then the AP does not include an HEC_UTR subfield in the first HE A-Control field (block 525). However, if the AP determines that the first MPDU is not addressed to a group address (and assuming that other rules for the inclusion of the HEC-UTR subfield are satisfied), the AP includes a first HEC-UTR subfield in the first HE A-Control field (block 540). The first HEC-UTR subfield carries UL MU response scheduling information. In one embodiment, the first HEC-UTR subfield includes a duration subfield that carries information regarding a duration of the UL MU response, a resource allocation subfield that carries information regarding a resource unit assignment for the UL MU response, and an MCS subfield that carries information regarding a recommended MCS for the UL MU response. In one embodiment, if the A-MPDU includes one or more other HEC_UTR subfields, then the UL MU response scheduling information carried in the first HEC-UTR subfield is identical to the UL MU response scheduling information carried in the one or more other HEC-UTR subfields in the A-MPDU.

The operations described above ensure that the A-MPDU is generated according to a set of rules that allow the recipient of the A-MPDU (e.g., a STA) to unambiguously interpret the control information (e.g., UL MU response scheduling information) carried in the A-MPDU. For example, the set of rules may include a rule that a trigger frame should not be included in an A-MPDU when an MPDU that includes an HEC-UTR subfield is included in the A-MPDU. As another example, the set of rules may include a rule that an MPDU in an A-MPDU should not be addressed to a groupcast address when that MPDU includes an HEC-UTR subfield. As yet another example, the set of rules may include a rule that multiple HEC-UTR subfields included in an A-MPDU should carry identical UL MU response scheduling information. As yet another example, the set of rules may include a rule that multiple trigger frames included in an A-MPDU should carry identical scheduling information. These rules are provided by way of example and not limitation. It should be understood that the A-MPDU can be generated according to a different set of rules.

In one embodiment, the HE A-Control field includes an HEC-ROMI subfield that carries information regarding a change in receiver operation. In one embodiment, the HE A-Control field includes an HEC-QoSC subfield that carries information for requesting or providing a buffer status report. In one embodiment, the HE A-Control field includes an HEC-CQIC subfield that carries information regarding channel quality. In one embodiment, the HE A-Control field includes an HEC-PC subfield that carries information for requesting or confirming a power adjustment. In one embodiment, the HE A-Control field includes an HEC-RUA subfield that carries scheduling information for an upcoming downlink frame. In one embodiment, the HE A-Control field includes an HEC-IQIM subfield that carries information regarding IQ imbalance parameters. In one embodiment, the A-MPDU includes a second MPDU, where a MAC header of the second MPDU includes a second HE A-Control field that includes a second HEC-UTR subfield that carries an extension of the UL MU response scheduling information carried in the first HEC-UTR subfield.

The AP then transmits the A-MPDU through a wireless medium (block 550). In this way, the AP generates and transmits an A-MPDU that elicits a UL MU response. The A-MPDU is generated according to a set of rules to allow the recipient of the A-MPDU (e.g., a STA) to unambiguously interpret the control information (e.g., UL MU response scheduling information) carried in the A-MPDU.

FIG. 5B is a flow diagram of a process for generating and transmitting MPDUs that elicit an uplink transmission, according to some embodiments. In one embodiment, the process is implemented by an AP in a WLAN. However, it should be understood that the process may also be implemented by a non-AP STA. For sake of illustration, the process is described as being performed by the AP. The AP provides a first MPDU in a downlink frame, where the first MPDU is addressed to a first set of STAs and the first MPDU includes first trigger information for scheduling an uplink transmission (block 560). The AP also provides a second MPDU in the downlink frame, where the second MPDU is addressed to a second set of STAs and the second MPDU includes second trigger information for scheduling the uplink transmission (block 565). The second trigger information includes a set of values that are set to be the same as a first set of values in the first trigger information. This may help ensure that the uplink transmission by the first set of STAs and the second set of STAs are combined properly/constructively. The AP then transmits the downlink frame to the first and second set of STAs (block 570).

In one embodiment, the first MPDU includes a first trigger frame and the first trigger information is located within the first trigger frame. In one embodiment, the first trigger information includes one or more common information fields, which are targeted at each station in the first set of stations addressed by the first MPDU for use in the uplink transmission, and one or more sets of station specific fields, where each set of station specific fields are targeted at a single station in the first set of stations for use in the uplink transmission. In one embodiment, the second MPDU includes a second trigger frame and the second trigger information is located within the second trigger frame. In one embodiment, the second trigger frame includes one or more common information fields, which are targeted at each station in the first set of stations addressed by the second MPDU for use in the uplink transmission, and one or more sets of station specific fields, where each set of station specific fields are targeted at a single station in the second set of stations for use in the uplink transmission, and where the first set of values are in the one or more common information fields in the first trigger information and the second set of values are in the one or more common information fields in the second trigger information. FIG. 7, which is described in additional detail below, shows exemplary common information fields. FIG. 8, which is described in additional detail below, shows exemplary station specific fields.

In one embodiment, the one or more common information fields in the first trigger information includes a first trigger type field, which indicates a response type requested by the AP using the first trigger information, and first trigger dependent information, which indicates settings for the response type indicated by the first trigger type field. In one embodiment, the one or more common information fields in the second trigger information includes a second trigger type field, which indicates a response type requested by the AP using the second trigger information, and second trigger dependent information, which indicates settings for the response type indicated by the second trigger type field. In one embodiment, the first trigger type field and the second trigger type field are distinct (e.g., they indicate different response types). For example, the first trigger type field may indicate trigger type TT1 (e.g., for MU-BAR) and the second trigger type field may indicate trigger type TT2 (e.g., for random access). This allows the AP to elicit different types of responses from the first set of stations and the second set of stations.

In one embodiment, the one or more common information fields in the first trigger information and the one or more common information fields in the second trigger information each include (1) a length field, which indicates a length of the uplink transmission, (2) a bandwidth field, which indicates a bandwidth of the uplink transmission, (3) a guard interval and long training field (LTF) field, which describes a combination of guard interval and LTF for the uplink transmission, (4) a spatial reuse field, which indicates whether spatial reuse is permitted during transmission of the uplink transmission, and (5) a signaling reserved field, which indicates settings for reserved bits in the uplink transmission. In one embodiment, the first set of values correspond to the length field, the bandwidth field, the guard interval and LTF field, the spatial reuse field, and the signaling reserved field in the first trigger information, and the second set of values correspond to the length field, the bandwidth field, the guard interval and LTF field, the spatial reuse field, and the signaling reserved field in the second trigger information. Having the same value for these particular fields may help ensure that the uplink transmission by the first set of STAs and the second set of STAs can be combined properly/constructively.

In one embodiment, when the first trigger information is located within the first trigger frame (in the first MPDU) and when the second trigger information is located in a MAC header of the second MPDU (e.g., a trigger frame and HEC-UTR or UL MU Response Scheduling A-Control subfield appear in same PPDU), the AP sets the one or more common information fields as follows. The AP sets a multi-user multiple-input-multiple-output long training mode field in the one or more common information fields of the first trigger information to indicate use of single stream pilot tones for the uplink transmission. The AP sets an STBC field in the one or more common information fields of the first trigger information to indicate that STBC is not to be utilized for the uplink transmission. The AP sets a number of HE LTF symbols field in the one or more common information fields of the first trigger information to indicate that a single LTF symbol is used in the uplink transmission. The AP sets a spatial reuse field in the one or more common information fields of the first trigger information to indicate that spatial reuse is disallowed during the uplink transmission. The AP sets a guard interval and LTF Type field in the one or more common information fields of the first trigger information to indicate use of 4× LTF sequence and a 3.2 µs cyclic prefix in the uplink transmission when the downlink frame uses a 4×LTF sequence and a 3.2 µs cyclic prefix or when the downlink frame uses a 2×LTF sequence and a 1.6 µs cyclic prefix. The AP sets the guard interval and LTF Type field in the one or more common information fields of the first trigger information to indicate use of 2×LTF sequence and a 1.6 µs cyclic prefix in the uplink transmission when the downlink frame does not use a 4×LTF sequence and a 3.2 µs cyclic prefix or a 2×LTF sequence and a 1.6 µs cyclic prefix.

In one embodiment, the first trigger information is located in a MAC header of the first MPDU and the second trigger information is located in a MAC header of the second MPDU (e.g., HEC-UTR subfield appears more than once in the same PPDU). In this embodiment, the AP may set a length field in the first set of values to the same value as a length field in the second set of values, where the length field in the first set of values and the length field in the second set of values indicate the length of the uplink transmission, and also set a downlink transmission power field in the first set of values to the same value as a downlink transmission power field in the second set of values, where the downlink transmission power field in the first set of values and the downlink transmission power field in the second set of values indicate the transmission power of the AP during transmission of the downlink frame.

Figure 5C:
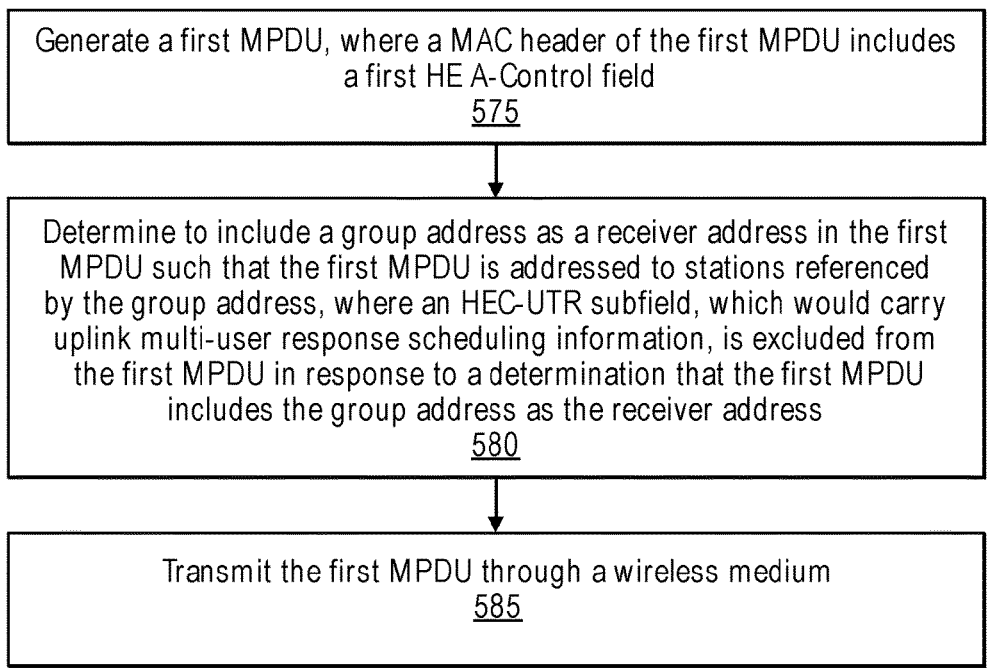
FIG. 5C is a flow diagram of a process for generating and transmitting an MPDU, according to some embodiments.

FIG. 5C is a flow diagram of a process for generating and transmitting an MPDU, according to some embodiments. In one embodiment, the process is implemented by an AP in a WLAN. However, it should be understood that the process may also be implemented by a non-AP STA. For sake of illustration, the process is described as being performed by the AP. The AP generates a first MPDU, where a MAC header of the first MPDU includes a first HE A-Control field (block 575). The AP determines to include a group address as a receiver address in the first MPDU such that the first MPDU is addressed to STAs referenced by the group address, where an HEC-UTR subfield (which would carry UL MU response scheduling information) is excluded from the first MPDU in response to a determination that the first MPDU includes the group address as the receiver address (block 580). This is to adhere to the rule that an HEC-UTR subfield is not allowed to be included in an MPDU/A-MPDU that has a groupcast address as the intended recipient. The AP then transmits the first MPDU through a wireless medium (block 585).

In one embodiment, the first MPDU includes, in the HE A-Control field, one or more of (1) an operating mode indication subfield (e.g., HEC-ROMI subfield) that carries information regarding a change in receiver operation, (2) quality of service control subfield (e.g., HEC-QoSC subfield) that carries information for requesting or providing a buffer status report, (3) power control subfield (e.g., HEC-PC subfield) that carries information for requesting or confirming a power adjustment, and (4) channel quality information control subfield (e.g., HEC-CQIC subfield) that carries information regarding channel quality, including a recommend number of spatial streams and a recommended MCS.

In one embodiment, the AP generates a second MPDU, where the first MPDU and the second MPDU are included in an A-MPDU. In one embodiment, the A-MPDU includes either an HEC-UTR subfield or a trigger frame (but not both).

Figure 5D:
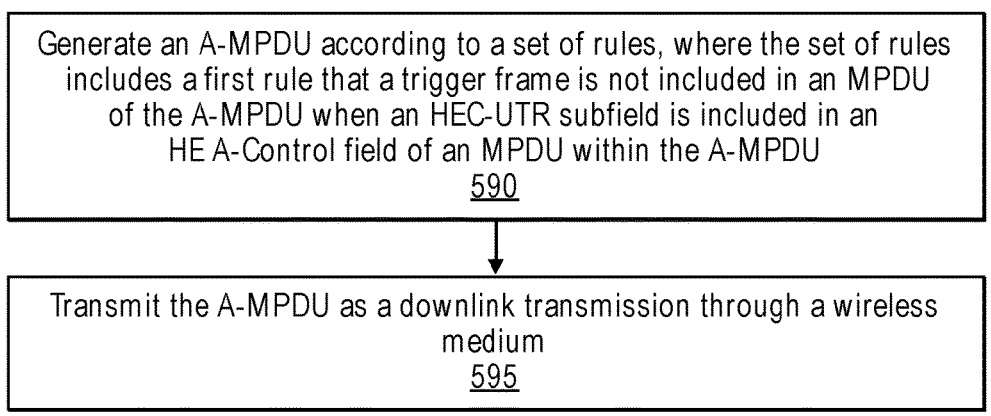
FIG. 5D is a flow diagram of a process for generating and transmitting an A-MPDU that elicits a UL MU response, according to some embodiments.

FIG. 5D is a flow diagram of a process for generating and transmitting an A-MPDU that elicits a UL MU response, according to some embodiments. In one embodiment, the process is implemented by an AP in a WLAN. However, it should be understood that the process may also be implemented by a non-AP STA. For sake of illustration, the process is described as being performed by the AP. The AP generates an A-MPDU according to a set of rules, where the set of rules includes a first rule that a trigger frame is not included in an MPDU of the A-MPDU when an HEC-UTR subfield is included in an HE A-Control field of an MPDU within the A-MPDU (block 590). This is to adhere to the rule that an A-MPDU includes either one or more HEC-UTR subfields or one or more trigger frames addressed to the same STA, but not both. The AP then transmits the A-MPDU as a downlink transmission through a wireless medium (block 595).

In one embodiment, the set of rules includes a second rule that multiple trigger frames included in the downlink transmission carry identical scheduling information. This rule may allow for unambiguous interpretation of scheduling information. In one embodiment, the scheduling information includes (1) a length field, which indicates a length of the UL MU response, (2) a bandwidth field, which indicates a bandwidth of the UL MU response, (3) a guard interval and long training field (LTF) field, which describes a combination of guard interval and LTF for the UL MU response, (4) a spatial reuse field, which indicates whether spatial reuse is permitted during transmission of the UL MU response, and (5) a signaling reserved field, which indicates settings for reserved bits in the UL MU response. In one embodiment, the set of rules includes a third rule that a trigger type field and trigger type-dependent field are distinct between the multiple trigger frames within the downlink transmission (e.g., one trigger frame indicates trigger type TT1 for MU-BAR and another trigger frame indicates trigger type TT2 for random access). In one embodiment, the set of rules includes a rule that an MPDU in the A-MPDU cannot be addressed to a groupcast address when that MPDU includes an HEC-UTR subfield in an HE A-Control field.

Multi-Type Trigger Frame

As previously mentioned above, an AP may initiate a UL MU simultaneous transmission by transmitting a trigger frame (sometimes referred to as a UL-Poll frame) to a set of STAs that are to participate in the UL MU simultaneous transmission. The trigger frame may serve various purposes. One purpose of the trigger frame is to provide a reference to the STAs that are to participate in the UL MU simultaneous transmission in terms of time and/or frequency with regard to the AP. Another purpose of the trigger frame is to provide information regarding the UL MU simultaneous transmission such as the set of STAs that are expected to participate in the UL MU simultaneous transmission, the assignment of transmission resources (or RUs) to the STAs, and various PHY layer and MAC layer attributes for the UL MU simultaneous transmission.

FIG. 6 is a diagram illustrating a format of a trigger frame, according to some embodiments. As shown in FIG. 6, the trigger frame includes a Frame Control field, a Duration field, a Receiver Address (RA) field, a Transmitter Address (TA) field, a Common Info field, one or more Per-user Info fields, and a Frame Check Sequence (FCS) field. The Common Info field (which is sometimes referred to as UL MU PPDU attributes field) is used to carry information regarding the UL MU PPDU that is common to all of the STAs that are expected to participate in the UL MU simultaneous transmission. A Per-user Info field (which is sometimes referred to as STA Physical Layer Service Data Unit (PSDU) attributes field) is used to carry information regarding the UL MU PPDU that is specific to a particular STA from the STAs that are expected to participate in the UL MU simultaneous transmission. In one embodiment, the trigger frame includes a Per-user Info field for each STA that is expected to participate in the UL MU simultaneous transmission.

FIG. 7 is a diagram illustrating a format of a Common Info field, according to some embodiments. The Common Info field may include a Trigger Type subfield, a Length subfield, a Cascade Information subfield, a Carrier Sense (CS) Required subfield, a Bandwidth (BW) subfield, a CP and LTF type subfield, an MU MIMO LTF Mode subfield, a Number of LTF subfield, an STBC subfield, a Low-Density Parity Check (LDPC) Extra Symbol subfield, an AP Transmit (Tx) Power subfield, a Packet Extension subfield, a Spatial Reuse subfield, and a Type-dependent Common Info subfield.

The Trigger Type subfield is used to carry information regarding the type of response that is expected from the STAs that are expected to participate in the UL MU simultaneous transmission. In one embodiment, the Trigger Type subfield is encoded according to Table I. For example, a trigger frame may act as an MU-BAR that seeks BA frame responses from the STAs (e.g., when the value in Trigger Type subfield is set to 2). As another example, a trigger frame may act as a Multi-user Request-to-Send (MU-RTS) that seeks Clear-to-Send (CTS) frame responses from the STAs (e.g., when the value in Trigger Type subfield is set to 3). In one embodiment, if a STA does not have the response type requested by the trigger frame, the STA may instead send a QoS Null data frame (or any other data frame that fits into the duration/length of the UL MU simultaneous transmission) with buffer size formation for a specific TID or all TIDs. In one embodiment, the buffer size information is carried in an HEC-QoSC subfield in the MAC header of an MPDU. In one embodiment, the buffer size information is carried in a QoS field in the MAC header of an MPDU. In one embodiment, if a STA does not have the response type requested by the trigger frame, the STA may instead send a QoS Null data frame (or any other data frame that fits into the duration/length of the UL MU simultaneous transmission) with channel quality information for full-band or one or more sub-bands (or RUs). In one embodiment, the channel quality information is carried in an HEC-CQIC subfield in the MAC header of an MPDU.

TABLE I

| Trigger Type Subfield Value | Description |
| --- | --- |
| 0 | Basic Trigger |
| 1 | Beamforming Report Poll |
| 2 | MU-BAR |
| 3 | MU-RTS |
| 4 | Buffer Status Report Poll (BSPR) |
| 5-15 | Reserved |

The BW subfield is used to carry information regarding the bandwidth of the UL MU PPDU. For example, the value in this subfield may be set to '0' to indicate 20 MHz bandwidth, '1' to indicate 40 MHz bandwidth, '2' to indicate 80 MHz bandwidth, and '3' to indicate 160 and 80+80 MHz bandwidth. The CP and LTF type subfield is used to carry information regarding the CP and LTF type of the UL MU PPDU. For example, the CP and LTF type could be any of the following: 2×LTF+1.6 µs, 4×LTF+3.2 µs, and 1×LTF+ 1.6 µs. 1×LTF+1.6 µs gives a 1×LTF mode for UL OFDMA and UL MU-MIMO. Longer CP helps with arrival time spreads in uplink transmissions. The MU MIMO LTF Mode subfield is used to carry information regarding the LTF mode of a UL MU-MIMO trigger-based PPDU response. In one embodiment, the value in the MU MIMO LTF Mode subfield is set to indicate a Single Stream pilot if the trigger-based PPDU response contains partial or full UL OFDMA allocation. The Number of LTF subfield is used to carry information regarding the number of HE-LTF symbols present in the trigger-based PPDU response. The number of HE-LTF symbols is a function of the total number of space-time streams. The STBC subfield is used to carry information regarding the status of STBC encoding of the trigger-based PPDU response. In one embodiment, the value in the STBC subfield is set to '1' to indicate that STBC encoding is used and set to '0' otherwise. The LDPC extra symbol subfield is used to carry information regarding the status of LDPC extra symbol. In one embodiment, the value in the LDPC Extra Symbol field is set to '1' to indicate that LDPC extra symbol is present and set to '0' otherwise. The AP Tx Power subfield is used to carry information regarding the combined average power per 20 MHz bandwidth of all transmit antennas used to transmit the trigger frame at the AP. In one embodiment, the value in this field is coded in units of decibels relative to 1 mW. In one embodiment, the granularity of the transmit power indicated in this field is 1 dB. The Packet Extension subfield is used to carry information regarding the packet extension duration of the trigger-based PPDU response. In one embodiment, the Packet Extension subfield is 3 bits in length, where the first two bits are used to indicate the "a-factor" and the third bit is used to indicate the packet extension (PE) disambiguity.

FIG. 8 is a diagram illustrating a format of a Per-user Info field, according to some embodiments. The Per-user Info field may include a User Identifier subfield, an RU allocation subfield, a Coding Type subfield, an MCS subfield, a DCM subfield, an SS Allocation subfield, a Target RSSI subfield, and a Type-dependent Per User Info subfield.

The User Identifier subfield is used to carry information that identifies a STA. In one embodiment, the value in this field is set to the 12 least significant bits of the AID of the STA that is being identified. The SS Allocation subfield is used to carry information regarding the spatial streams of the trigger-based PPDU response of the STA identified in the User Identifier subfield. In one embodiment, the SS Allocation subfield is 6 bits in length, where three bits are used to indicate starting spatial stream and 3 bits are used to indicate spatial stream number. The Target RSSI subfield is used to carry information regarding the target received signal power of the trigger-based PPDU response. In one embodiment, the value in this field is coded in units of decibels relative to 1 mW. In one embodiment, the granularity of the target received signal power carried in this field is 1 dB.

The trigger frame described above is structured such that all of the STAs that are expected to participate in the UL MU simultaneous transmission transmit a particular type of data frame or a specific type of control frame or control information (e.g., CTS response, BA, buffer status report, beamforming report) during the UL MU simultaneous transmission. The trigger frame thus constrains all of the STAs to sending the same response type during the UL MU simultaneous transmission. However, it may be advantageous for different STAs that participate in the UL MU simultaneous transmission to be able to send different response types during the UL MU simultaneous transmission.

The benchmark for allowing different STAs to send different response types is that the AP sends a trigger frame that elicits a specific response type, receives the responses, then sends another trigger frame that elicits a different response type and then receives the responses, and so on. However, as mentioned above, this constrains all of the STAs that participate in a given UL MU simultaneous transmission to send the same response type.

One option to overcome the above-mentioned constraint is for the AP to aggregate multiple trigger frames within a single PPDU, where each trigger frame elicits a specific response type from a set of STAs that are expected to respond with that specific response type. While this option is possible, it causes the PPDU to become very lengthy with many duplicated subfields. Also, considering that trigger frames are typically sent with low MCS, this could also cause the PPDU that carries the trigger frames to become lengthy.

Another option is for the AP to send a DL MU PPDU that includes multiple trigger frames within multiple RUs. In one embodiment, when group addressing is available to address a set of STAs (e.g., 11ac GID or other group addressing mechanism such as Groupcast with Retries (GCR) group addressing), the AP sends a trigger frame that elicits a specific response type to the set of STAs that are expected to respond with that specific response type. In an embodiment where group addressing is not available, the AP may send a trigger frame for each STA. While this is possible, it causes additional overhead due to the repetition of many subfields in the trigger frames, as well as the overhead of the MU PPDUs (e.g., lengthy SIG-B).

In one embodiment, to overcome some of the disadvantages described above, the trigger frame includes a Per-user Type (PUT) subfield in each Per-user Info field, where the PUT subfield is used to carry information regarding the type of response that is expected from a particular STA (or group of STAs). In one embodiment, the PUT subfield is the first subfield in the Per-user Info field. In one embodiment, as a consequence of the inclusion of a PUT subfield in a Per-user Info field, the Common Info field does not include a Trigger Type subfield. In another embodiment, the Common Info field still includes a Trigger Type subfield and the value in the Trigger Type subfield is set to a predetermined value that indicates that the trigger type is multi-type (MT), meaning that each Per-user Info field carries information regarding the expected response type. A trigger frame that carries information regarding the expected response type per STA in a Per-user Info field is referred to as an MT trigger frame.

In one embodiment, the Common Info field of an MT trigger frame has the same subfields as a traditional trigger frame. In one embodiment, the Common Info field of an MT trigger frame does not include any type-dependent subfields. In one embodiment, the Common Info field of an MT trigger frame includes a subfield that carries information regarding the number of Per-user Info fields included in the MT trigger frame and the length of each Per-user Info field.

In one embodiment, a Per-user Info field in an MT trigger frame has variable length depending on the value in the PUT subfield in that Per-user Info field. In one embodiment, a Per-user Info field includes the following subfields, as shown in FIG. 9: (1) the first subfield (or one of the first few subfields) of the Per-user Info field is the PUT subfield, which is used to carry information that identifies the type of response that is expected; (2) the subfields that are included in a traditional Per-user Info field that are used to carry information that is not dependent on the expected response type (e.g., the User Identifier subfield, the MCS subfield, the Coding Type subfield, the RU Allocation subfield, the SS Allocation subfield, the DCM subfield, and/or the Target RSSI subfield; (3) the subfields in the Type-dependent Common Info subfield associated with the expected response type indicated in the PUT subfield; and (4) the subfields in the Type-dependent Per-user Info subfield associated with the expected response type indicated in the PUT subfield.

In one embodiment, for a given value in the PUT subfield in a Per-user Info field, the Per-user Info field has an a priori known length, and based on this, the beginning of the next Per-user Info field within the trigger frame can be identified (this may help ease parsing of the Per-user Info fields when the Common Info field of the MT trigger frame does not have any type-dependent subfields). In this embodiment, a STA that processes a trigger frame may recognize, based on the value in the Trigger Type subfield in the Common Info field, that the trigger frame is an MT trigger frame and also recognize from this that the Per-user Info fields of the trigger frame may have variable lengths. The STA may locate the first Per-user Info field and inspect the User Identifier subfield and the PUT subfield to determine whether the Per-user Info field is intended for the STA and to determine the length of the Per-user Info field, respectively. If the first Per-user Info field is not intended for the STA, then the STA skips the first Per-user Info field and locates the next Per-user Info field based on the length of the first Per-user Info field. The STA may continue to iterate through the Per-user Info fields in this fashion until the STA locates a Per-user Info field that is intended for itself.

Including a PUT subfield in the Per-user Info field allows an AP to elicit different types of responses from the STAs addressed in the Per-user Info fields using a single trigger frame. For example, an AP may use a single trigger frame to elicit a buffer status report from one or more STAs and also elicit uplink data transmission from one or more other STAs. As another example, an AP may use a single trigger frame to elicit a BA frame from one or more STAs and also elicit uplink data transmission from one or more other STAs. As yet another example, an AP may use a single trigger frame to elicit a buffer status report from one or more STAs, BA frames from one or more other STAs, and uplink data transmission from one or more other STAs. In one embodiment, an AP may use a single trigger frame to elicit beamforming (BF) report from one or more other STAs (where those STAs were subject to an HE BF Sounding in an immediately preceding period of time), while also eliciting a different type of response. In one embodiment, an AP may use a single trigger frame to elicit a channel quality information report from one or more STAs, while also eliciting a different type of response.

In one embodiment, an AP may use a single trigger frame to elicit multiple types of responses from a single STA. It is assumed that the AP will allocate enough number of RUs and/or enough duration/length that allows an aggregation of multiple response types (e.g., control information such as buffer status report, control frames such as BA frame, and/or data frames). In one embodiment, this is allowed by introducing a new trigger type for the particular case of interest. For example, a particular trigger type may be defined to elicit a BA frame, along with a buffer status report in a data frame or in a QoS Null frame (this is considered to be a combination of an MU-BAR and a buffer status (BS) request, so it may be referred to as BARBS). As another example, a particular trigger type may be defined to elicit a BF Sounding report, along with a buffer status report in a data frame or in a QoS Null frame. As yet another example, a particular trigger type may be defined to elicit a channel quality information report, along with a buffer status report in a data frame or in a QoS null frame. These examples may be useful when an AP desires to acquire accurate knowledge of the channel condition with a STA (e.g., sounding report or channel quality information report) and also desires to know the buffer status of the STA so that the AP has better information to schedule any upcoming UL MU simultaneous transmissions.

As yet another example, a particular trigger type may be used to elicit a BA frame and also allocate enough transmission resources for UL data transmission for particular TIDs or ACs that is allowed or specified within the trigger frame (this is considered to be a combination of an MU-BAR and a basic trigger). This example may be useful for when there is bidirectional traffic, where the AP requests acknowledgements for frames previously sent to a STA and also expects that there will be data payload in the uplink direction. This example may also be useful for cases where short higher-layer acknowledgement packets (e.g., Transmission Control Protocol (TCP) ACK) are expected from the STA. In such a case, the AP may use a trigger frame to schedule a UL MU simultaneous transmission, where the trigger type indicates that ACK/BA frames and any potential data frames are elicited (e.g., the data frame may be higher layer acknowledgements from the STA). This example may also be useful for multicast transmission (e.g., GCR multicast) where an AP, after transmission of one or more multicast frames to a group of STAs, sends a trigger frame that elicit ACK frames and any data frames from the group of STAs (which could include higher layer acknowledgement frames). As yet another example, a particular trigger type may be used to elicit a BA, one or more buffer status reports, and also allocate enough transmission resources for uplink data transmission for particular TIDs or ACs that is allowed or specified within the trigger frame (this is considered to be a combination of MU-BAR, buffer status request, and basic trigger).

Thus, using the techniques described herein, a trigger frame may elicit a particular type of response from one or more STAs, another type of response from one or more other STAs, and an aggregated response that combines multiple types of responses from one or more other STAs.

Figure 10:
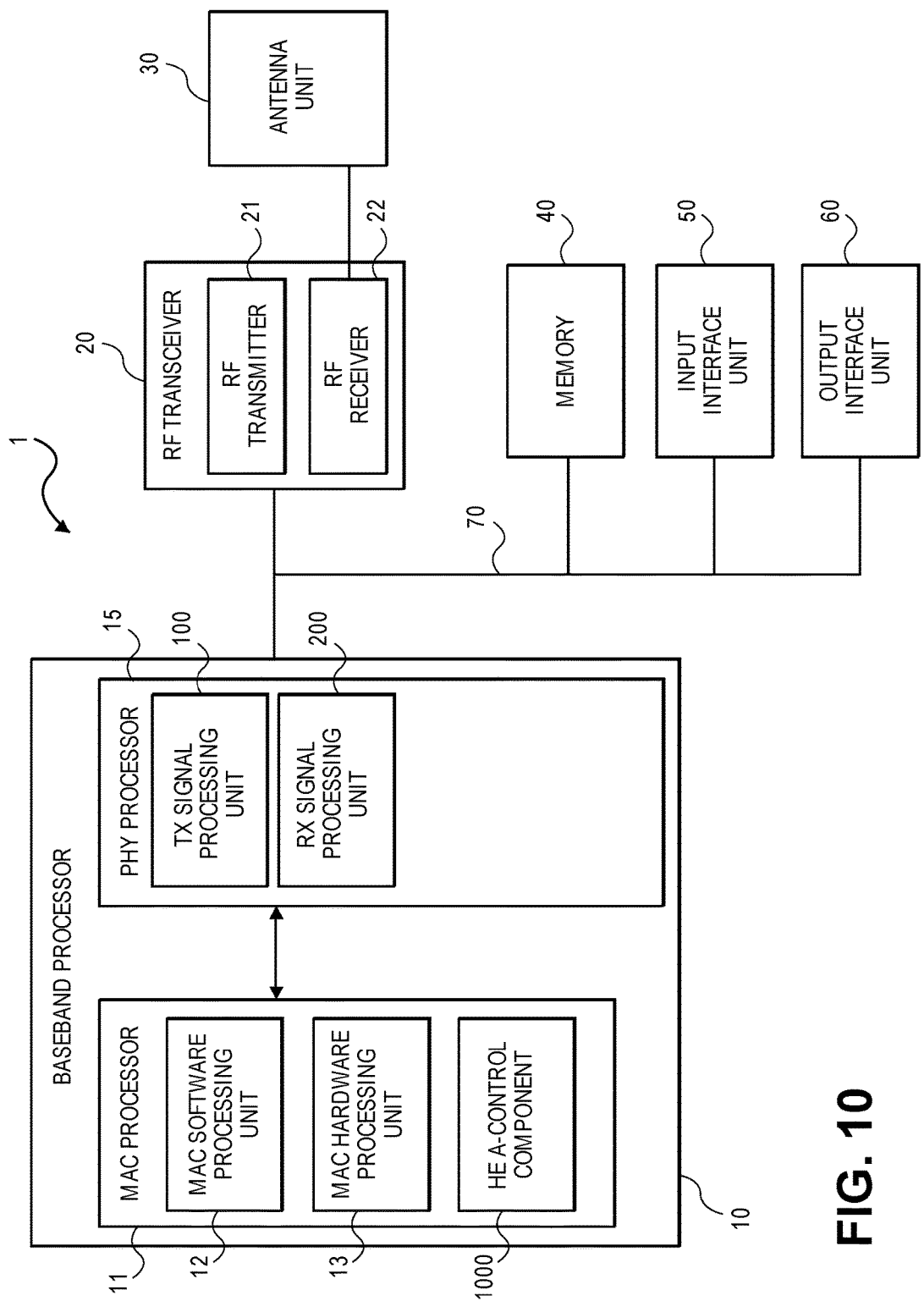
FIG. 10 is a block diagram of a network device implementing a STA or AP that executes an HE A-Control component, according to some embodiments.
Figure 11:
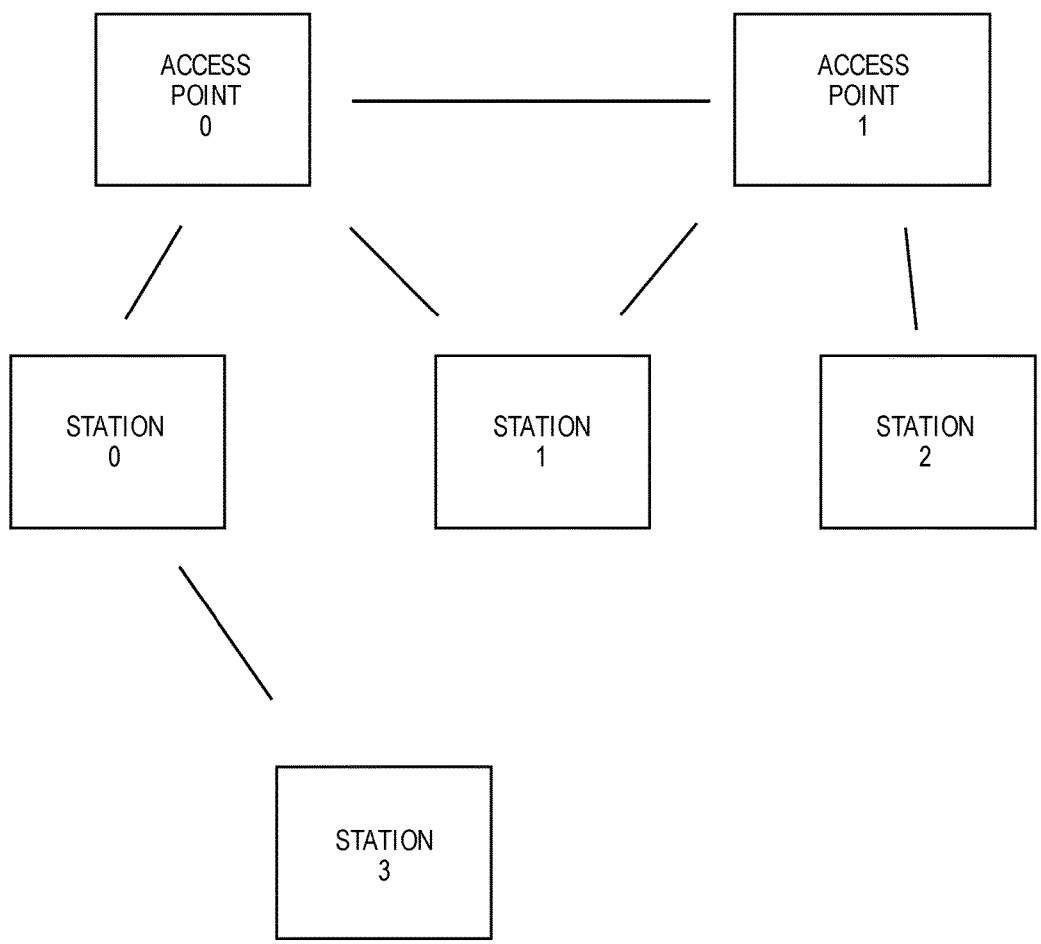
FIG. 11 is a block diagram of a WLAN, according to some embodiments.

FIG. 10 is a block diagram of a network device implementing a STA or AP that executes an HE A-Control component, according to some embodiments. In a wireless local area network (WLAN) such as the example WLAN illustrated in FIG. 11, a basic service set (BSS) includes a plurality of network devices referred to herein as WLAN devices. Each of the WLAN devices may include a medium access control (MAC) layer and a physical (PHY) layer according to IEEE 802.11 standard. In the plurality of WLAN devices, at least one WLAN device may be an AP station (e.g., access point 0 and access point 1 in FIG. 11) and the other WLAN devices may be non-AP stations (non-AP STAs), (e.g., stations 0-3 in FIG. 11). Alternatively, all of the plurality of WLAN devices may be non-AP STAs in an Ad-hoc networking environment. In general, the AP STA and the non-AP STA may be each referred to herein as a station (STA). However, for ease of description, only the non-AP STA will be referred to herein as a STA whereas the AP stations are referred to herein as APs for ease of description. As shown in FIG. 11, a WLAN can have any combination of STAs and APs that can form a discrete network, an ad hoc network or any combination thereof. Any number of APs and STAs can be included in a WLAN and any topology and configuration of such APs and STAs in the network can be utilized.

The example WLAN device 1 includes a baseband processor 10, a radio frequency (RF) transceiver 20, an antenna unit 30, memory 40, an input interface unit 50, an output interface unit 60, and a bus 70. The baseband processor 10 performs baseband signal processing, and includes a MAC processor 11 and a PHY processor 15. These processors can be any type of integrated circuit (IC) including a general processing unit or an application specific integrated circuit (ASIC). In some embodiments, the MAC processor 11 also implements an HE A-Control component 1000 (or more generally, an HE Control component). The HE A-Control component 1000 can implement the respective functions for any combination of the embodiments described herein above. In other embodiments, the HE A-Control component 1000 may be implemented by or distributed over both the PHY processor 15 and the MAC processor 11. The HE A-Control component 1000 may be implemented as software or as hardware components of either the PHY processor 15 or MAC processor 11.

In one embodiment, the MAC processor 11 may include a MAC software processing unit 12 and a MAC hardware processing unit 13. The memory 40 may store software (hereinafter referred to as "MAC software"), including at least some functions of the MAC layer. The MAC software processing unit 12 executes the MAC software to implement some functions of the MAC layer and the MAC hardware processing unit 13 may implement the remaining functions of the MAC layer in hardware (hereinafter referred to "MAC hardware"). However, the MAC processor 11 is not limited to this distribution of functionality.

The PHY processor 15 includes a transmitting signal processing unit 100 and a receiving signal processing unit 200 described further herein below with reference to FIGS. 12 and 13.

The baseband processor 10, the memory 40, the input interface unit 50, and the output interface unit 60 may communicate with each other via the bus 70. The radio frequency (RF) transceiver 20 includes an RF transmitter 21 and an RF receiver 22. The memory 40 may further store an operating system and applications. In some embodiments, the memory may store recorded information about captured frames. The input interface unit 50 receives information from a user and the output interface unit 60 outputs information to the user.

The antenna unit 30 includes one or more antennas. When a MIMO or MU-MIMO system is used, the antenna unit 30 may include a plurality of antennas.

Figure 12:
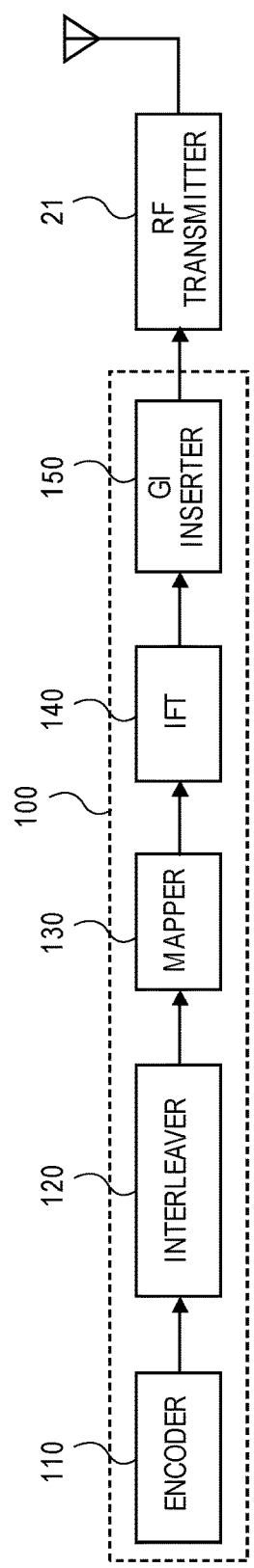
FIG. 12 is a schematic block diagram exemplifying a transmitting signal processor in a WLAN device, according to some embodiments.

FIG. 12 is a schematic block diagram exemplifying a transmitting signal processor in a WLAN device, according to some embodiments. Referring to the above drawing, a transmitting signal processing unit 100 includes an encoder 110, an interleaver 120, a mapper 130, an inverse Fourier transformer (IFT) 140, and a guard interval (GI) inserter 150. The encoder 110 encodes input data. For example, the encoder 110 may be a forward error correction (FEC) encoder. The FEC encoder may include a binary convolutional code (BCC) encoder followed by a puncturing device or may include a low-density parity-check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder to change the order of bits. Interleaving may be applied only when BCC encoding is used. The mapper 130 maps the sequence of bits output from the interleaver to constellation points. If LDPC encoding is used in the encoder 110, the mapper 130 may further perform LDPC tone mapping in addition to constellation mapping.

When multiple input-multiple output (MIMO) or multiple user (MU)-MIMO is used, the transmitting signal processing unit 100 may use a plurality of interleavers 120 and a plurality of mappers 130 corresponding to the number $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When MIMO or MU-MIMO is used, the transmitting signal processing unit 100 may insert cyclic shift diversities (CSDs) to prevent unintentional beamforming. The CSD insertion may occur before or after the inverse Fourier transform 140. The CSD may be specified per transmit chain or may be specified per space-time stream. Alternatively, the CSD may be applied as a part of the spatial mapper. When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 13:
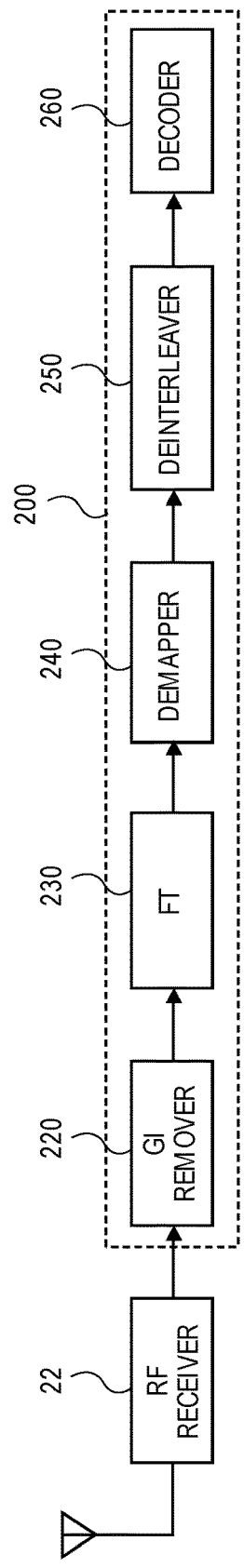
FIG. 13 is a schematic block diagram exemplifying a receiving signal processing unit in a WLAN device, according to some embodiments.

FIG. 13 is a schematic block diagram exemplifying a receiving signal processing unit in the WLAN device, according to some embodiments. Referring to FIG. 13, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time domain block) into a block of constellation points by using a discrete Fourier transform (DFT) or a fast Fourier transform (FFT). The Fourier transformer 230 may be provided for each receive chain.

When MIMO or MU-MIMO is used, the receiving signal processing unit 200 may use a spatial demapper for converting the Fourier transformed receiver chains to constellation points of the space-time streams and an STBC decoder for despreading the constellation points from the space-time streams into the spatial streams.

The demapper 240 demaps the constellation points output from the Fourier transformer 230 or the STBC decoder to bit streams. If LDPC encoding is used, the demapper 240 may further perform LDPC tone demapping before constellation demapping. The deinterleaver 250 deinterleaves the bits of each stream output from the demapper 240. Deinterleaving may be applied only when BCC encoding is used.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 260 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

Figure 14:
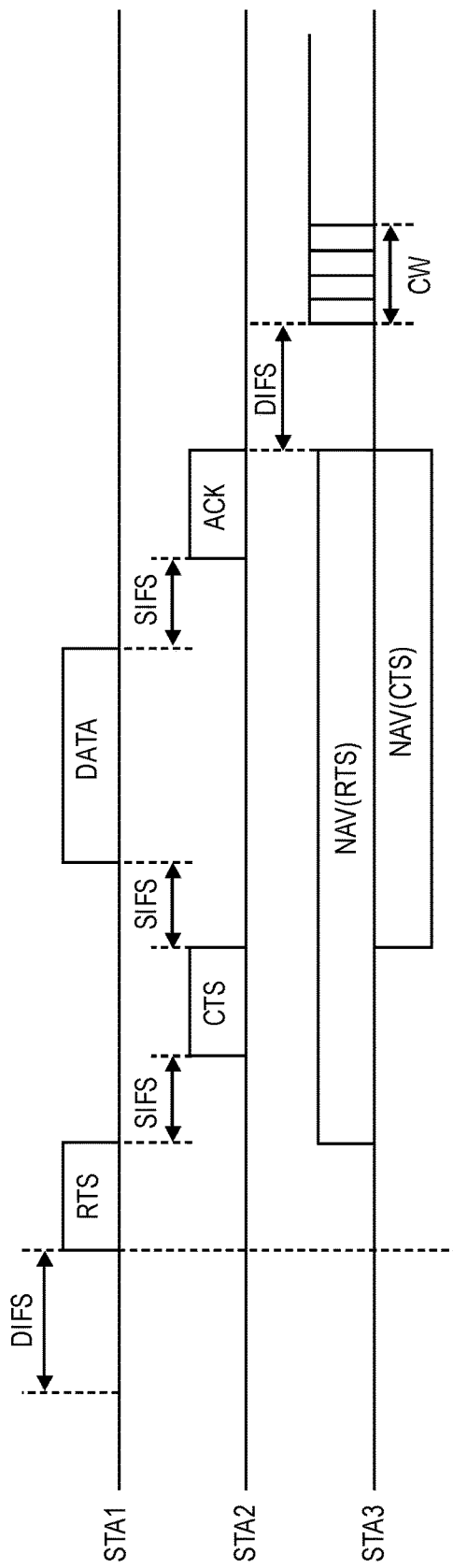
FIG. 14 is a timing diagram providing an example of the Carrier Sense Multiple Access/Collision Avoidance (CSMA/CA) transmission procedure, according to some embodiments.

FIG. 14 is a timing diagram providing an example of the Carrier Sense Multiple Access/Collision Avoidance (CSMA/CA) transmission procedure, according to some embodiments. In the illustrated example, STA1 is a transmit WLAN device for transmitting data, STA2 is a receive WLAN device for receiving the data, and STA3 is a WLAN device, which may be located at an area where a frame transmitted from the STA1 and/or a frame transmitted from the STA2 can be received by the WLAN device.

STA1 may determine whether the channel is busy by carrier sensing. The STA1 may determine the channel occupation based on a quality of the signal on the channel or correlation of signals in the channel, or may determine the channel occupation by using a NAV timer.

When determining that the channel is not used by other devices during DIFS (that is, the channel is idle), STA1 may transmit an RTS frame to STA2 after performing backoff. Upon receiving the RTS frame, STA2 may transmit a CTS frame as a response of the CTS frame after SIFS. When STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When STA3 receives the CTS frame, it may set the NAV timer for a transmission duration of subsequently transmitted frames (for example, a duration of SIFS+data frame duration+SIFS+ACK frame duration) by using duration information included in the CTS frame. Upon receiving a new frame before the NAV timer expires, STA3 may update the NAV timer by using duration information included in the new frame. STA3 does not attempt to access the channel until the NAV timer expires.

When STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, STA3 may determine whether the channel is busy through the use of carrier sensing techniques. Upon determining that the channel is not used by other devices during DIFS and after the NAV timer has expired, STA3 may attempt channel access after a contention window according to random backoff elapses.

FIG. 15 is a diagram illustrating a downlink OFDMA transmission to a set of STAs, according to some embodiments. The horizontal dimension is the time dimension or number of OFDM symbols. The vertical dimension is the frequency dimension or number of tones/subcarriers. The term "sub-band" may be used to refer to a set of contiguous tones or subcarriers that as a whole are assigned for a payload whose expected destination is a single STA or a set of STAs. In the illustrated example, the bandwidths of individual sub-bands are the same due to the size of the payload sent to each STA. However, it should be noted that this is purely exemplary, and that the bandwidth assigned to the STAs may vary depending on payload size, the MCS used, the number of spatial streams that the AP decides to assign for each sub-band, the overall consideration by the AP to roughly align the length/duration of various Physical Layer Service Data Unit (PSDU) sub-bands, and other factors. Prior to the individual PSDUs for the STAs, there are multiple symbols that have various roles.

Legacy STF/LTF/SIG are symbols based on an early design of 802.11 specification. The presence of these symbols allow backward compatibility with legacy designs and products. The legacy STF, LTF, and SIG symbols can be modulated/carried with FFT size of 64 on 20 MHz sub-channel and may be duplicated every 20 MHz if the DL OFDMA PPDU has wider bandwidth than 20 MHz.

HI SIG-A and SIG-B are symbols that may carry information regarding each PSDU, as well as the Radio Frequency (RF), physical layer (PHY), and media access control (MAC) properties of the DL OFDMA PPDU. In one embodiment, HE SIG-A and HE SIG-B may be carried/modulated using FFT size of 64 or 256. HE SIG-B may not always be present in a DL OFDM PPDU or UL OFDMA PPDU.

HE ST/LTF symbols are used to perform necessary RF and PHY processing for each PSDU and/or for the whole PPDU. Depending on whether HE STF/LTF symbols are beamformed or not, there might be two sets of such symbols, as further described below.

The full-band transmission region (denoted as "full-band PSDU" in the diagram) is for unicast or broadcast/multicast PSDU(s). This region could be an optional region in a DL OFDMA PPDU that has a variable length. A region in a DL OFDMA PPDU may refer to a set of symbols that covers the entire bandwidth of the DL OFDMA PPDU but across several OFDM symbols before the start of the sub-band region where each sub-band is assigned to a STA or set of STAs. If the full-band transmission region is present in the DL OFDMA PPDU, there might be a set of HE STF and/or HE LTF symbols that appear right before the full-band transmission region, where these HE STF and/or HE/LTF are not beamformed. The full-band transmission region can be carried with FFT=64 or FFT=256.

Each PSDU contains the payload that is destined to a STA plus the necessary MAC padding and PHY padding. The broadcast PSDU(s) located in the full-band transmission region are destined to all the STAs that are associated to the AP. The presence and length of such PSDU(s) can be indicated in HE SIG-A or HE SIG-B. The unicast PSDU(s) are typically located in the sub-band region, and are destined to a STA that is associated to the AP. The presence and length of a PSDU in a sub-band or set of sub-bands, as well as the STA that is the recipient of the unicast PSDU is indicated in HE SIG-A and/or HE SIG-B.

In one embodiment, the entire bandwidth could be 20 MHz, where each of the sub-bands has 5 MHz bandwidth. In another embodiment, the entire bandwidth could be 40 MHz, where each of the sub-bands has 10 MHz bandwidth. In yet another embodiment, the entire bandwidth could be 80 MHz, where each of the sub-bands has 20 MHz bandwidth.

The solutions provided herein have been described with reference to a wireless LAN system; however, it should be understood that these solutions are also applicable to other network environments, such as cellular telecommunication networks, wired networks, and similar communication networks.

An embodiment may be an article of manufacture in which a non-transitory machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

Some portions of the preceding detailed descriptions have been presented in terms of algorithms and symbolic representations of operations on data bits within a computer memory. These algorithmic descriptions and representations are the ways used by those skilled in conferencing technology to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a conference device, or similar electronic computing device, that manipulates and transforms data represented as physical (electronic) quantities within the conference device's registers and memories into other data similarly represented as physical quantities within the conference device's memories or registers or other such information storage, transmission or display devices.

While the flow diagrams in the figures herein show a particular order of operations performed by certain embodiments, it should be understood that such order is exemplary (e.g., alternative embodiments may perform the operations in a different order, combine certain operations, overlap certain operations, etc.).

While techniques have been described in terms of several embodiments, those skilled in the art will recognize that the present disclosure is not limited to the embodiments described, and that the techniques can be practiced with modification and alteration within the spirit and scope of the appended claims. The description is thus to be regarded as illustrative instead of limiting.

What is claimed is:

1. A method implemented by an Access Point (AP) in a Wireless Local Area Network (WLAN), the method comprising:
    providing, by the AP, a first Media Access Control (MAC) Protocol Data Unit (MPDU) in a downlink frame, wherein the first MPDU is addressed to a first set of stations and the first MPDU includes first trigger information for scheduling an uplink transmission;
    providing, by the AP, a second MPDU in the downlink frame, wherein the second MPDU is addressed to a second set of stations and the second MPDU includes second trigger information for scheduling the uplink transmission and the second trigger information includes a second set of values that are set to be the same as a first set of values in the first trigger information, wherein the second set of values that are set to be the same as the first set of values includes a value indicative of a combination of guard interval and long training field (LTF) for the uplink transmission; and
    transmitting, by the AP, the downlink frame to the first and second set of stations.

2. The method of claim 1, wherein the first MPDU includes a first trigger frame and the first trigger information is located within the first trigger frame,
    wherein the first trigger information includes one or more common information fields, which are targeted at each station in the first set of stations addressed by the first MPDU for use in the uplink transmission, and one or more sets of station specific fields, wherein each set of station specific fields are targeted at a single station in the first set of stations for use in the uplink transmission.

3. The method of claim 2, wherein the second MPDU includes a second trigger frame and the second trigger information is located within the second trigger frame,
    wherein the second trigger information includes one or more common information fields, which are targeted at each station in the second set of stations addressed by the second MPDU for use in the uplink transmission, and one or more sets of station specific fields, wherein each set of station specific fields are targeted at a single station in the second set of stations for use in the uplink transmission,
    wherein the first set of values are in the one or more common information fields in the first trigger information and the second set of values are in the one or more common information fields in the second trigger information.

4. The method of claim 3, wherein the one or more common information fields in the first trigger information includes a first trigger type field, which indicates a response type requested by the AP using the first trigger information, and first trigger dependent information, which indicates settings for the response type indicated by the first trigger type field, and the one or more common information fields in the second trigger information includes a second trigger type field, which indicates a response type requested by the AP using the second trigger information, and second trigger dependent information, which indicates settings for the response type indicated by the second trigger type field,
    wherein the first trigger type field and the second trigger type field are distinct.

5. The method of claim 3, wherein the one or more common information fields in the first trigger information and the one or more common information fields in the second trigger information each include (1) a length field, which indicates a length of the uplink transmission, (2) a bandwidth field, which indicates a bandwidth of the uplink transmission, (3) a guard interval and long training field (LTF) field, which describes the combination of guard interval and LTF for the uplink transmission, (4) a spatial reuse field, which indicates whether spatial reuse is permitted during transmission of the uplink transmission, and (5) a signaling reserved field, which indicates settings for reserved bits in the uplink transmission.

6. The method of claim 5, wherein the first set of values correspond to the length field, the bandwidth field, the guard interval and LTF field, the spatial reuse field, and the signaling reserved field in the first trigger information, and
wherein the second set of values correspond to the length field, the bandwidth field, the guard interval and LTF field, the spatial reuse field, and the signaling reserved field in the second trigger information.

7. The method of claim 2, wherein when the second trigger information is located in a MAC header of the second MPDU, the method further comprising:
setting a multi-user multiple-input-multiple-output long training mode field in the one or more common information fields of the first trigger information to indicate use of single stream pilot tones for the uplink transmission;
setting a space time block coding (STBC) field in the one or more common information fields of the first trigger information to indicate that STBC is not to be utilized for the uplink transmission;
setting a number of high-efficiency long training field (LTF) symbols field in the one or more common information fields of the first trigger information to indicate that a single LTF symbol is used in the uplink transmission;
setting a spatial reuse field in the one or more common information fields of the first trigger information to indicate that spatial reuse is disallowed during the uplink transmission;
setting a guard interval and LTF Type field in the one or more common information fields of the first trigger information to indicate use of 4×LTF sequence and a 3.2 μs cyclic prefix in the uplink transmission when the downlink frame uses a 4×LTF sequence and a 3.2 μs cyclic prefix or when the downlink frame uses a 2×LTF sequence and a 1.6 μs cyclic prefix; and
setting the guard interval and LTF Type field in the one or more common information fields of the first trigger information to indicate use of 2×LTF sequence and a 1.6 μs cyclic prefix in the uplink transmission when the downlink frame does not use a 4×LTF sequence and a 3.2 μs cyclic prefix or a 2×LTF sequence and a 1.6 μs cyclic prefix.

8. The method of claim 1, wherein the first trigger information is located in a MAC header of the first MPDU and the second trigger information is located in a MAC header of the second MPDU, the method further comprising:
setting a length field in the first set of values to the same value as a length field in the second set of values, wherein the length field in the first set of values and the length field in the second set of values indicate the length of the uplink transmission; and
setting a downlink transmission power field in the first set of values to the same value as a downlink transmission power field in the second set of values, wherein the downlink transmission power field in the first set of values and the downlink transmission power field in the second set of values indicate the transmission power of the AP during transmission of the downlink frame.

9. A method implemented by an Access Point (AP) in a Wireless Local Area Network (WLAN) to generate and transmit a Media Access Control (MAC) Protocol Data Unit (MPDU), the method comprising:
generating a first MPDU, wherein a MAC header of the first MPDU includes a first High Efficiency Aggregated Control (HE A-Control) field;
determining to include a group address as a receiver address in the first MPDU such that the first MPDU is addressed to stations referenced by the group address, wherein a High Efficiency Control Unicast Trigger Frame (HEC-UTR) subfield, which would carry uplink multi-user response scheduling information, is excluded from the HE A-Control field of the first MPDU in response to a determination that the first MPDU includes the group address as the receiver address; and
transmitting the first MPDU through a wireless medium.

10. The method of claim 9, wherein the first MPDU includes in the HE A-Control field one or more of (1) an operating mode indication subfield that carries information regarding a change in receiver operation, (2) quality of service control subfield that carries information for requesting or providing a buffer status report, (3) power control subfield that carries information for requesting or confirming a power adjustment, and (4) channel quality information control subfield that carries information regarding channel quality, including a recommend number of spatial streams and a recommended modulation and coding scheme.

11. The method of claim 9, further comprising:
generating a second MPDU, wherein the first MPDU and a second MPDU are included in an Aggregated MPDU (A-MPDU), wherein the A-MPDU includes either a HEC-UTR subfield or a trigger frame.

12. A method implemented by an Access Point (AP) in a Wireless Local Area Network (WLAN) to generate and transmit an Aggregated Media Access Control (MAC) Protocol Data Unit (A-MPDU) that elicits an uplink (UL) multi-user (MU) response, the method comprising:
generating an A-MPDU according to a set of rules, wherein the set of rules includes a first rule that a trigger frame is not included in a MAC Protocol Data Unit (MPDU) of the A-MPDU when a High Efficiency Control Unicast Trigger Frame (HEC-UTR) subfield is included in a High Efficiency Aggregated Control (HE A-Control) field of an MPDU within the A-MPDU; and
transmitting the A-MPDU as a downlink transmission through a wireless medium.

13. The method of claim 12, wherein the set of rules includes a second rule that multiple trigger frames included in the downlink transmission carry identical scheduling information.

14. The method of claim 13, wherein the scheduling information includes (1) a length field, which indicates a length of the UL MU response, (2) a bandwidth field, which indicates a bandwidth of the UL MU response, (3) a guard interval and long training field (LTF) field, which describes a combination of guard interval and LTF for the UL MU response, (4) a spatial reuse field, which indicates whether spatial reuse is permitted during transmission of the UL MU response, and (5) a signaling reserved field, which indicates settings for reserved bits in the UL MU response.

15. The method of claim 13, wherein the set of rules includes a third rule that a trigger type field and a trigger type-dependent field are distinct between the multiple trigger frames within the downlink transmission.

16. The method of claim 12, wherein the set of rules includes a second rule that an MPDU in the A-MPDU cannot be addressed to a groupcast address when that MPDU includes an HEC-UTR subfield in an HE A-Control field.

17. The method of claim 12, wherein the downlink transmission includes a first MPDU that includes a first trigger frame that carries first trigger information, wherein the first trigger information includes one or more common information fields, which are targeted at each station in a first set of stations addressed by the first MPDU for use in the UL MU response, and one or more sets of station specific fields, wherein each set of station specific fields are targeted at a single station in the first set of stations for use in the UL MU response.

18. The method of claim 17, wherein the downlink transmission includes a second MPDU that includes a second trigger frame that includes a second trigger frame that carries second trigger information, wherein the second trigger information includes one or more common information fields, which are targeted at each station in a second set of stations addressed by the second MPDU for use in the UL MU response, and one or more sets of station specific fields, wherein each set of station specific fields are targeted at a single station in the second set of stations for use in the UL MU response.

19. The method of claim 17, wherein the downlink transmission includes a second MPDU, wherein a MAC header of the second MPDU carries second trigger information, the method further comprising:
setting a multi-user multiple-input-multiple-output long training mode field in the one or more common information fields of the first trigger information to indicate use of single stream pilot tones for the UL MU response;
setting a space time block coding (STBC) field in the one or more common information fields of the first trigger information to indicate that STBC is not to be utilized for the UL MU response;
setting a number of high-efficiency long training field (LTF) symbols field in the one or more common information fields of the first trigger information to indicate that a single LTF symbol is used in the UL MU response;
setting a spatial reuse field in the one or more common information fields of the first trigger information to indicate that spatial reuse is disallowed during the UL MU response;
setting a guard interval and LTF Type field in the one or more common information fields of the first trigger information to indicate use of 4×LTF sequence and a 3.2 µs cyclic prefix in the UL MU response when a downlink frame uses a 4×LTF sequence and a 3.2 µs cyclic prefix or when the downlink frame uses a 2×LTF sequence and a 1.6 µs cyclic prefix; and
setting the guard interval and LTF Type field in the one or more common information fields of the first trigger information to indicate use of 2×LTF sequence and a 1.6 µs cyclic prefix in the UL MU response when a downlink frame does not use a 4×LTF sequence and a 3.2 µs cyclic prefix or a 2×LTF sequence and a 1.6 µs cyclic prefix.

20. The method of claim 12, wherein the downlink transmission includes a first MPDU addressed to a first set of stations and a second MPDU addressed to a second set of stations, wherein a MAC header of the first MPDU includes first trigger information for scheduling the UL MU response and a MAC header of the second MPDU includes second trigger information for scheduling the UL MU response, the method further comprising:
setting a length field in the first trigger information to the same value as a length field in the second trigger information, wherein the length field in the first trigger information and the length field in the second trigger information indicate the length of the UL MU response; and
setting a downlink transmission power field in the first trigger information to the same value as a downlink transmission power field in the second trigger information, wherein the downlink transmission power field in the first trigger information and the downlink transmission power field in the second trigger information indicate the transmission power of the AP during the downlink transmission.

* * * * *